US008031726B2

(12) United States Patent
Ansari et al.

(10) Patent No.: US 8,031,726 B2
(45) Date of Patent: Oct. 4, 2011

(54) BILLING, ALARM, STATISTICS AND LOG INFORMATION HANDLING IN MULTI-SERVICES GATEWAY DEVICE AT USER PREMISES

(75) Inventors: Amir Ansari, Plano, TX (US); George A. Cowgill, Farmersville, TX (US); Ramprakash Masina, Wylie, TX (US); Jude P. Ramayya, Wylie, TX (US); Alvin R. McQuarters, Euless, TX (US); Atousa Raissyan, Potomac, MD (US); Leon E. Nicholls, Plano, TX (US); Wesley R. Erhart, McKinney, TX (US)

(73) Assignee: Prodea Systems, Inc., Plano, TX (US)

( * ) Notice: Subject to any disclaimer, the term of this patent is extended or adjusted under 35 U.S.C. 154(b) by 420 days.

(21) Appl. No.: 11/966,936

(22) Filed: Dec. 28, 2007

(65) Prior Publication Data
US 2008/0165789 A1  Jul. 10, 2008

Related U.S. Application Data

(60) Provisional application No. 60/882,865, filed on Dec. 29, 2006, provisional application No. 60/882,862, filed on Dec. 29, 2006.

(51) Int. Cl.
*H04L 12/28* (2006.01)
(52) U.S. Cl. .................. 370/401; 709/219; 709/224
(58) Field of Classification Search ............ 370/395.4, 370/412, 389, 352; 709/232, 227
See application file for complete search history.

(56) References Cited

U.S. PATENT DOCUMENTS
5,878,223 A   3/1999   Becker et al.
(Continued)

FOREIGN PATENT DOCUMENTS
EP   1113659 A   7/2001
(Continued)

OTHER PUBLICATIONS

Haerick W et al., Success in Home Service Deployment: Zero-Touch or Chaos?, British Telecommunications, Jul. 1, 2007, pp. 36-43, vol. 4, No. 3, London, GB.

(Continued)

*Primary Examiner* — Michael J Moore, Jr.
(74) *Attorney, Agent, or Firm* — Haynes and Boone, LLP

(57) ABSTRACT

A gateway device for operation at a user premises having at least one endpoint device associated with the gateway device, the gateway device being in communication with a remote service manager comprises an application service module having at least one application, the application service module being remotely managed by a remote service manager via a connection, the application service module residing on a user premises side of a network service provider demarcation, a user module having a user interface that is associated with the at least one application, wherein the user module enables bi-directional communications with the at least one endpoint device, a network module having the connection that enables bi-directional communications with the remote service manager, a processor coupled to the user module, application service module, and network module, and a storage device coupled to the processor operable to store operational information generated by and related to the gateway device, and having a management module operable to generate, collect, process, and provide access to the operational information under the control of the remote service manager.

60 Claims, 13 Drawing Sheets

U.S. PATENT DOCUMENTS

| | | | |
|---|---|---|---|
| 6,016,520 A | 1/2000 | Facq et al. | |
| 6,055,569 A | 4/2000 | O'Brien et al. | |
| 6,426,955 B1 | 7/2002 | Dalton, Jr. et al. | |
| 6,622,168 B1 | 9/2003 | Datta | |
| 6,871,193 B1* | 3/2005 | Campbell et al. | 705/67 |
| 6,889,321 B1 | 5/2005 | Kung et al. | |
| 6,891,838 B1* | 5/2005 | Petite et al. | 370/401 |
| 6,931,445 B2* | 8/2005 | Davis | 709/224 |
| 7,480,724 B2* | 1/2009 | Zimler et al. | 709/229 |
| 7,551,071 B2* | 6/2009 | Bennett et al. | 340/506 |
| 7,765,294 B2* | 7/2010 | Edwards et al. | 709/224 |
| 7,933,970 B2* | 4/2011 | Zimler et al. | 709/217 |
| 2002/0046279 A1* | 4/2002 | Chung | 709/227 |
| 2002/0071440 A1* | 6/2002 | Cerami et al. | 370/404 |
| 2002/0176404 A1* | 11/2002 | Girard | 370/352 |
| 2003/0169752 A1 | 9/2003 | Chen et al. | |
| 2004/0073867 A1 | 4/2004 | Kausik et al. | |
| 2004/0133657 A1 | 7/2004 | Smith et al. | |
| 2004/0230695 A1* | 11/2004 | Anschutz et al. | 709/232 |
| 2005/0076198 A1 | 4/2005 | Skomra et al. | |
| 2005/0257039 A1 | 11/2005 | Marshall | |
| 2006/0029064 A1 | 2/2006 | Rao et al. | |
| 2006/0031476 A1 | 2/2006 | Mathes et al. | |
| 2006/0153214 A1* | 7/2006 | Moore et al. | 370/401 |
| 2006/0271695 A1* | 11/2006 | Lavian | 709/229 |
| 2006/0291506 A1 | 12/2006 | Cain | |
| 2007/0192477 A1* | 8/2007 | Hicks et al. | 709/223 |
| 2008/0052393 A1* | 2/2008 | McNaughton et al. | 709/224 |
| 2008/0069121 A1* | 3/2008 | Adamson et al. | 370/401 |
| 2008/0130666 A1* | 6/2008 | Kawamoto et al. | 370/401 |
| 2008/0144642 A1* | 6/2008 | Song | 370/401 |
| 2008/0304500 A1* | 12/2008 | Schliserman et al. | 370/401 |

FOREIGN PATENT DOCUMENTS

| | | |
|---|---|---|
| EP | 1 394 986 | 3/2004 |
| WO | WO 0193533 A2 | 12/2001 |
| WO | WO 2007/004921 A1 | 1/2007 |
| WO | 2008021665 A2 | 2/2008 |

OTHER PUBLICATIONS

Duenas JC et al., An end-to-end service provisioning scenario for the residential environment, IEEE Communications Magazine, Sep. 1, 2005, pp. 94-100, vol. 43, No. 9, IEEE Service Center, Piscataway, US.

Il-Woo Lee et al., A Proposed Platform & Performance Estimation of Digital-Home Service Delivery/Management Systems, Apr. 10, 2006, pp. 713-719, Information Technology: New Generations, 2006. ITNG 2006. Third International Conference on Las Vegas, NV, USA Apr. 10-12, 2006.

PCT Notification of Transmittal of the International Search Report and the Written Opinion of the International Searching Authority, or the Declaration dated Feb. 26, 2008, for PCT Application No. PCT/US07/19483, 11 pages.

PCT Notification of Transmittal of the International Search Report and the Written Opinion of the International Searching Authority, or the Declaration dated Mar. 14, 2008, for PCT Application No. PCT/US07/19533, 12 pages.

PCT International Searching Authority—European Patent Office, PCT Notification of Transmittal of the International Search Report and the Written Opinion of the International Searching Authority, or the Declaration, Aug. 27, 2008, 24 pages, Application No. PCT/US2007/089237.

PCT International Searching Authority—European Patent Office, PCT Notification of Transmittal of the International Search Report and the Written Opinion of the International Searching Authority, or the Declaration, Aug. 8, 2008, 22 pages, Application No. PCT/US2007/089227.

PCT International Searching Authority—European Patent Office, PCT Notification of Transmittal of the International Search Report and the Written Opinion of the International Searching Authority, or the Declaration mailed Oct. 22, 2008, 12 pages, Application No. PCT/US2007/089232.

Young-Gab Kim et al., A Service Bundle Authentication Mechanism in the OSGI Service Platform, Advanced Information Networking and Applications, 2004, AINA 2004. 18th International Conference on Fukuoka, Japan, Mar. 29-31, 2004, Piscataway, NJ, USA, IEEE, vol. 1, Mar. 29, 2004, pp. 420-425, XP010695453, ISBN: 978-0-7695-2051-3.

* cited by examiner

FIG. 12

| Module | Order | Statistic | Description |
|---|---|---|---|
| String | Int | String | Database Field Type |
| Status | 0 | backupStatus | Status of the Backup service.<br>0 is no attempts<br>1 is < 50% success<br>2 is <= 80% success<br>3 is 100% success |
| Status | 1 | voiceStatus | Status of the Voice service.<br>0 is no attempts<br>1 is < 50% success<br>2 is <= 80% success<br>3 is 100% success |
| Status | 2 | mediaStatus | Status of the Media service.<br>0 is no attempts<br>1 is < 50% success<br>2 is <= 80% success<br>3 is 100% success |
| Status | 3 | billingStatus | Status of the Billing service.<br>0 is no attempts<br>1 is < 50% success<br>2 is <= 80% success<br>3 is 100% success |

250

BILLING, ALARM, STATISTICS AND LOG INFORMATION HANDLING IN MULTI-SERVICES GATEWAY DEVICE AT USER PREMISES

RELATED APPLICATIONS

This application claims the benefit of U.S. Provisional Application No. 60/882,865 Filed Dec. 29, 2006 entitled "A Multi-Services Application Gateway And System Employing The Same," and of U.S. Provisional Application No. 60/882,862 Filed Dec. 29, 2006 entitled "System And Method For Providing Network Support Services And Premise Gateway Support Infrastructure," the disclosures of which are incorporated herein by reference.

This application is related to co-pending applications U.S. patent application Ser. No. 11/966,884, filed Dec. 28, 2007, entitled "Activation, Initialization, Authentication, and Authorization for a Multi-Services Gateway Device at User Premises," and to U.S. patent application Ser. No. 11/966,945, filed Dec. 28, 2007, entitled "System and Method to Acquire, Aggregate, Manage, and Distribute Media," and to PCT International Application No. PCT/US2007/019546, filed Sep. 7, 2007, entitled "Multi-Services Application Gateway," and to PCT International Application No. PCT/US2007/019544, filed Sep. 7, 2007, entitled "System and Method for Providing Network Support Services and Premises Gateway Support Infrastructure," and to PCT International Application No. PCT/US2007/019545, filed Sep. 7, 2007, entitled "Subscription Management of Applications and Services Provided Through User Premises Gateway Devices," and to PCT International Application No. PCT/US2007/019543, filed Sep. 7, 2007, entitled "Demarcation Between Service Provider and User in Multi-Services Gateway Device at User Premises," and to PCT International Application No. PCT/US07/0195333, filed Sep. 7, 2007, entitled "Display Inserts, Overlays, and Graphical User Interfaces for Multimedia Systems," and to PCT International Application No. PCT/US07/19534, filed Sep. 7, 2007, entitled "Presence Status Notification From Digital Endpoint Devices Through a Multi-Services Gateway Device at the User Premises," and to PCT International Application PCT/US2007/019483, filed Sep. 7, 2007, entitled "Managed File Backup and Restore at Remote Storage Locations Through Multi-Services Gateway Device at User Premises," and to PCT International Application No. PCT/US2007/019531, filed Sep. 7, 2007, entitled "File Sharing Through Multi-Services Gateway Device at User Premises," the disclosures of which are incorporated herein by reference.

TECHNICAL FIELD

The present subject matter relates to the management of operational information for gateway devices from a user premises and/or for associated endpoint devices, and to facilitate management of the application services, where a demarcation is defined between resources of the gateway accessible to and managed by a service provider and service access by a user via an endpoint device.

BACKGROUND

The digital home is now becoming more complex with the myriad of new and emerging digital devices intended to address many user and consumer needs such as communication, entertainment, privacy, and security. However, given the complexity of the emerging digital home and digital environments generally, users who are technologically challenged may find it a daunting and intimidating task to manage their home networks and interconnected digital devices. Moreover, new paradigms are emerging oriented to delivering media content to and the consuming of media content at the home. Many of these paradigms rely on communication of application specific data to and/or from the Internet, as opposed to conventional telephone or broadcast video type applications. The protection of received Internet-sourced media content in addition to user-generated media content is additionally an important aspect that may be inadequately addressed by the technologically-challenged user. Furthermore, with respect to Internet-based data, most of the content delivery solutions are provided to the digital home networks through availability of the "two-foot" interface (i.e. the PC). It is relatively cumbersome to bring this content to the "ten-foot" interface (e.g. the television).

SUMMARY OF THE INVENTION

There exists a need for a system to simplify the overall management of services and applications available to the digital home or even the small enterprise. Such a system would reduce the complexity of the maintenance, upgrading, and operation of even the more basic needs addressed by emerging digital endpoint devices and networks. Approaches that suggest greater functionality in home-based appliances fail to reduce or address the complexity of managing and provisioning those appliances. For example, while the home gateway server appliance described in U.S. Pat. No. 6,930,598 enables networked electronic devices to communicate with each other without the direct interaction with external networks, and provides a mechanism whereby a member of the household may be informed of certain network related events without having to use their home computer or other client devices, it does not provide a convenient or simplified way of managing the services and applications executed by, or associated with, that device. Thus, an unmet need exists for a device associated within a user's premises that has robust functionality but does not require sophisticated or inordinate attention from the user to manage, provision, and utilize.

A gateway device for operation at a user premises having at least one endpoint device associated with the gateway device, the gateway device being in communication with a remote service manager comprises an application service module having at least one application, the application service module being remotely managed by a remote service manager via a connection, the application service module residing on a user premises side of a network service provider demarcation, a user module having a user interface that is associated with the at least one application, wherein the user module enables bi-directional communications with the at least one endpoint device, a network module having the connection that enables bi-directional communications with the remote service manager, a processor coupled to the user module, application service module, and network module, and a storage device coupled to the processor operable to store operational information generated by and related to the gateway device, and having a management module operable to generate, collect, process, and provide access to the operational information under the control of the remote service manager.

An endpoint device residing at a user premises comprises a connection to a gateway device via a network, an operational information module operable to generate and provide access to operational information related to the availability, status, integrity, quality and performance of the endpoint device by a remote service manager via the gateway device. The gateway device includes an application service module residing on a user premises side of a network service provider demarcation.

A system comprises at least one remote service manager coupled to a network, at least one gateway device disposed at a user premises and in communication with the at least one remote service manager via the network, the at least one gateway device comprising at least one application performing traditional server functions and disposed on a user premises side of a network service provider demarcation, at least one endpoint device disposed at the user premises and in communication through a user module with the at least one gateway device operable to, under the control of the gateway device, execute at least one application, and generate, collect, and provide access to operational information related to the execution of the at least one application. The at least one gateway device operable to, under the control of the at least one remote service manager, direct the at least one endpoint device to generate, collect, and provide access to operational information related to the execution of the at least one application, and to further generate, collect, and provide access to operational information related to the performance of the at least one gateway device.

A service management system managing application services delivered by endpoint devices via gateway devices disposed at user premises, where the service management system comprises a management module residing on the user premises coupled to a network module, the network module coupled to a router via a computer network, an interface boundary between the management module and the network module forming a network service provider demarcation, a connection manager operable to control system communications with the network module via the router and the computer network, and a central management module operable to direct the management module to generate, collect and analyze operational information to determine the availability, status, integrity, quality and performance of the application services, the gateway, and the endpoint devices.

A method of managing a operational information on a gateway device residing on a user premises having at least one endpoint device associated with the gateway device, where the method comprises delivering an application service traditionally residing on a network service provider's network through a network module to an application service module of the gateway device on the user premises side of a network service provider demarcation, executing the application service on the at least one endpoint device through a user module residing on the gateway device, directing the gateway device to generate and store the operational information related to the execution of the application service, the endpoint device, and the gateway device, directing the gateway device to process, aggregate, compress, and filter the operational information, and directing the gateway device to provide access and reporting on the operational information.

A computer-readable medium having encoded thereon a method of managing a gateway device for operation at a user premises having at least one endpoint device associated with the gateway device, where the encoded method comprises delivering an application service traditionally residing on a network service provider's network through a network module to an application service module of the gateway device on the user premises side of a network service provider demarcation, executing the application service on the at least one endpoint device through a user module residing on the gateway device, directing the gateway device to generate and store the operational information related to the execution of the application service, the endpoint device, and the gateway device, directing the gateway device to process, aggregate, compress, and filter the operational information, and directing the gateway device to provide access and reporting on the operational information.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 12 is a table illustrating summary statistics that a gateway device may send to a service management center to provide the status of the gateway device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In practice, a customer typically subscribes to basic transport services from a network service provider (e.g., ISP—Internet Service Provider, cable provider, fixed wireless providers, ILEC—Incumbent Local Exchange Carrier, or CLEC—Competitive Local Exchange Carrier). For example, a customer may have broadband Internet access, via cable modem, digital subscriber line service or the like. Digital video service may be provided separately. The network service provider manages these basic services, at the logical network layer, typically at layers 1, 2 and 3 of the Open Systems Interconnection (OSI) model. While network services and associated devices may operate minimally at those levels, they operate at those levels to support operations at OSI layers 1, 2 and 3. Many applications, however, involve higher level service logic for applications that view the network transport as simply a transport pipe. The current Internet applications delivery and management architecture, and many devices or management systems based on it, require a server with robust processing and storage capability to be located at the network operations center, not in the home. For Voice Over Internet Protocol (VoIP) type telephone service, for example, the VoIP service provider operates a session initiation protocol (SIP) server or the like, and each user has only client functionality. The network transport layers are transparent to the Internet Protocol (IP) packets containing the voice and related signaling data. The SIP server, however, controls the call set-up, tear-down, billing and the like for the voice call services. With such a legacy architecture, the major capabilities and functionalities connected with providing application services from the server throughout the network reside on the server and supporting elements, all of which are located in the network operations center of the network service provider.

Figure 1:
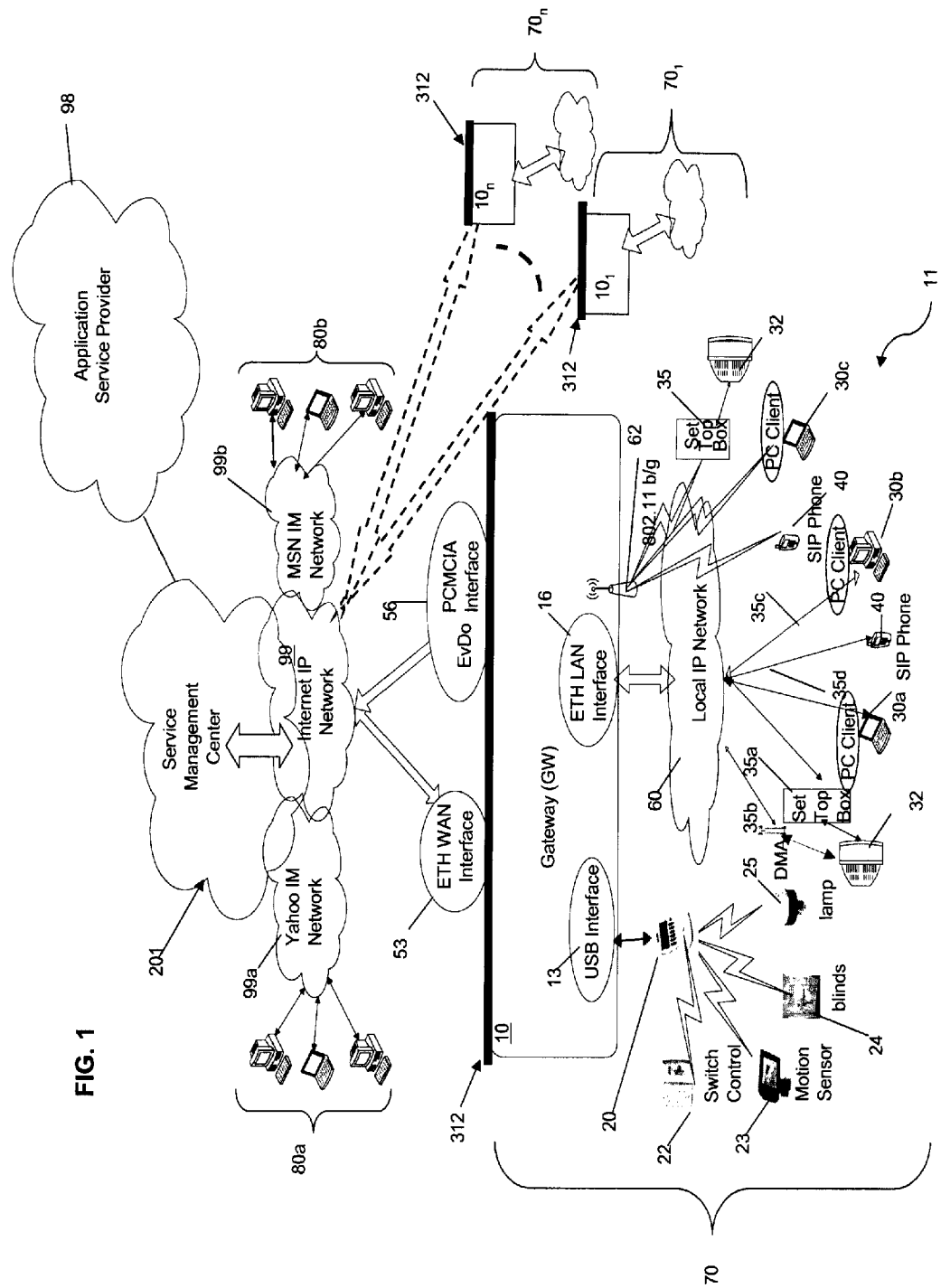
FIG. 1 is a network diagram of an embodiment of an exemplary system having a service management center connected to gateway devices that are connected to respective endpoint devices at the user premises.

FIG. 1 is a network diagram of an embodiment of an exemplary system having a service management center 201 connected to gateway devices 10 that are connected to respective endpoint devices 11 at the user premises. This secure platform for building and providing multiple application services for digital endpoints 11 associated with a gateway device 10 requires connectivity between the gateway device 10 and each of a user's endpoint devices 11. As shown in FIG. 1, this connectivity may be provided by network interfaces such as one or more USB interfaces 13, wired Local Area Network (LAN) connections such as provided by an Ethernet LAN interface 16, a wireless network interface via a WiFi LAN access point 62, other LAN transport technologies such as HPNA or HomePlugAV, or other technologies now available or hereafter developed. The WiFi connection may be implemented for example, in accordance with the I.E.E.E. 802.11b/g/n wireless network communications standard. These interfaces provide the required network interconnectivity for the endpoint devices 11 to connect to the gateway device 10 to access multiple application services residing on the gateway device 10. The connectivity between digital endpoint devices 11 and the gateway device 10 may be accomplished by other suitable means now known or to be developed, including, by way of example, through of a virtual private area network connection accessed through a WAN interface.

Exemplary endpoint devices 11, with which the gateway device 10 may communicate via the USB interface 13, include, for example, a home automation networking device 20 (e.g. X10, Z-Wave or ZigBee) for wired or wireless home network automation. The device 20 which in turn controls devices such as a switch controller 22, sensor devices 23, automatically-controlled window blinds 24, and a controlled lighting or lamp unit 25, for example. Furthermore, the gateway device 10 may communicate via the Ethernet LAN interface 16 across a local IP network 60 or via the WiFi LAN access point 62 to reach personal computing (PC) and laptop/mobile devices 30a, ..., 30c that serve as file sources, control points and hosts for various other endpoint devices 11. In addition, the gateway device 10 may communicate via Ethernet LAN interface 16 across a local IP network 60 or via WiFi LAN access point 62 to access one or more television display devices 32 including the associated set top boxes (STB) 35a or digital media adapters (DMA) 35b. As further examples, one or more SIP phones (or VoIP phone devices) 40, or other devices that convert IP interfaces to Public Switched Telephone Network (PSTN) Foreign eXchange Office (FXO) and Foreign eXchange Subscriber (FXS) interfaces may be accessed by gateway device 10 via Ethernet LAN interface 16 across a local IP network 60 or via WiFi LAN access point 62. The endpoint devices 11 shown in FIG. 1 and the respective interfaces used by gateway device 10 to reach the endpoint devices 11 are not intended to be comprehensive and one skilled in the art can appreciate other endpoint devices 11 as well as other methods to allow gateway device 10 to communicate with potential endpoint devices 11 within this exemplary system.

As noted earlier, the gateway device 10 may access the DMA 35b for a television display device 32, which enables bidirectional wireline or wireless communication. The DMA 35b supports several functions for multiple services including, but not limited to: media (e.g., video and music) by enabling the transfer of media (e.g., video and music) to the TV; voice services, by providing for Calling Line Identification (CLID) and for voice mail control; and provide Home Automation Services including status and control of networked home automation devices. The DMA 35b converts audio and video (optionally) to a format suitable for a TV. In addition, the DMA 35b may be capable of receiving context-sensitive commands from a remote control device (not shown) and forwarding those commands to the gateway device 10. This enables the use of menus on the television display device 32 for controlling application services and various features functions thereof, as offered by the gateway device 10. Therefore, the combination of the gateway device 10, DMA 35, and the television display device 32 one is able to provide the following features including, but not limited to: display of media; media control functions, when enabled (FF, REW, STOP, PAUSE, etc); display of CLID; control of voice-mail; picture viewing; control of home automation; and user functions for the gateway device 10.

A set top box 35a is in communication with the gateway device 10 via the wireless access point 62. The set top box 35a also may handle media format conversion (for example NTSC to ATSC television RF signals), digital decryption and other DRM (digital rights management) functions, Video On Demand Purchases, etc. The combination of the Set Top Box 35a with the television display device 32 may enable, by way of example, Media format conversion (for example NTSC to ATSC); decryption; other DRM functions (such as expiry of leases), prohibition of copying to digital outputs, function restriction, etc.; Video On Demand Purchases; and media control functions (e.g., FF, REW, STOP, PAUSE, etc.).

Whether provided by the DMA 35b and the television display device 32 or by the set-top-box 35a and the television display device 32, the communications to and from the television display device 32 provide a user interface for interaction with the gateway device 10. The software/firmware of the gateway device 10 supports, among other things, a graphical user interface (GUI) via the television display device 32, sometimes referred to as the "ten-foot" interface.

The PCs 30a, . . . , 30c shown in FIG. 1 interface with the gateway device 10 and serve as, among other things, file sources, control points and hosts for various software clients. The gateway device 10 may access PC device 30b via Ethernet LAN interface 16 across a local IP network 60 or via WiFi LAN access point 62. The gateway device 10 accessing the PC may provide for the bidirectional moving of files, and status and control for the endpoint devices 11, including for example, status and control of networked home automation devices. In addition, using the PCs 30a, . . . , 30c, users may access the gateway device 10 for any number of reasons, such as for example, share files on the gateway device 10 with other endpoint devices 11, back-up or transfer files to the gateway device 10 or other endpoint devices 11 having storage capabilities; access personal page for notifications, receive RDF site summary (RSS) or Atom feeds, share photos, and receive voicemail messages. In addition to the Instant Messaging and SIP capabilities of the gateway device 10, as will be described in more detail below, PCs 30a, . . . , 30c may also serve as a host for IM and SIP soft phone clients and other endpoint devices 11. The client-server interaction of the PCs 30a, . . . , 30c with the gateway device 10 offers an alternative GUI for at least some of the services. The PC based GUI is sometimes referred to as the "two-foot" interface.

Although not shown in FIG. 1, other digital endpoint devices 11 for which connectivity may be established with the gateway device 10 include, but are not limited to, media player devices (audio, video, audio/video, with or without metadata), hi-fi audio equipment with media streaming capability, game stations, Internet radio devices, WiFi phones, WiFi or other wirelessly enabled digital cameras, facsimile machines, electronic picture frames, health monitors (sensor and monitoring devices) and devices now known or to be developed. In addition to endpoint devices coupled via the LAN and WAN, the endpoint devices may be directly coupled to the gateway device off the Internet or private IP networks.

Although based on a client-server architecture, the exemplary system disclosed in FIG. 1 moves substantial functions performed by the typical network server into the user premises 70 by incorporating those functions into a gateway device 10, but in a way that allows for the server functionality to be externally managed by a service management center 201, which may in turn be operated by a third-party application service provider 98. Moreover, the architecture of the exemplary system does not require identity of the provider/manufacturer of the gateway device, the service management center or the third-party application service provider. Thus, a gateway device may be manufactured under the control of one entity, for distribution to one or more service management entities (each of which operates its own service management center). The gateway device may then be activated with a particular service management center under the control of a particular system management entity. A system management entity may be the entity that determines the mix of application services to which the user subscribes, or this "retail" function for application services may be performed by one or more application service providers, one or more of whom the user may subscribe to depending on the mix of application services offered by each application service provider. The term "application service provider" is used herein to refer to various entities up and down the "supply chain" and include, but are not limited to, manufacturers of the gateway device and endpoint devices, suppliers of the gateway device and endpoint devices, entities that provide, operate or manage application services, network service providers (described above), and entities that provide the activation manager function described in detail below. These entities in the supply chain may or may not operate or function independently of one another. Hereinafter, the term "remote service manager" is also used to refer to the service management center 201 and/or application service provider 98.

The server functionality residing in the gateway device 10 is not only located in the user premises 70 but it now resides on the user premises side of the traditional network service provider demarcation 312. The exemplary system shown in FIG. 1 does not just move server functionality from the servers in a traditional network operations center, where they were previously located, to the home; but it also moves the logical position of the execution of application services logic of the server to the user premises 70 side of the network service provider demarcation 312 and provides logical hooks to enable the external service manager to perform its function(s) on that side of the demarcation. For example, application service logic transmitted by application service provider 98 related to the use of one or more gateway devices 10 and/or endpoint devices 11 can now be provisioned, serviced and managed on the user premises 70 side of the network service provider demarcation 312, albeit by an external service management center 201 operated by or on behalf of a third-party application service provider 98. The application software architecture, coupled with the specific managed hardware implementation at the user premises 70, enables a single service provider to provide the network services such as IP network 99, whereas one or more application services providers 98 (possibly including the network service provider) can provide the applications services to the customer independently of providing the network service.

By distributing the application services to the user premises 70, but retaining a central management feature through the service management center 201 and the application service provider(s) 98, the disclosed exemplary system in FIG. 1 addresses network computing and traffic capacity and latency challenges of providing application services at the network level. The exemplary architecture thus results in significantly reduced latency and improved reliability.

Another aspect of the exemplary system in FIG. 1 is that it enables the application service provider 98 through the use of the service management center 201 to control hardware elements (endpoint devices 11) of various types located on the user premises 70 side of the network service provider demarcation 312 by communicating through the gateway device 10. The robustness of the gateway device 10, coupled with the central management capabilities of the service management center 201 and application service provider 98, allow the system to register, configure, provision, and enable intercommunication among, a wide variety of endpoint devices 11, such as TV, cell phone, radios, PC, and digital picture frames. Furthermore, the exemplary system can gather operational information such as billing records, alarms, statistical data, and log information associated with gateway device 10 and the endpoint devices 11 connected to gateway device 10. Such a centralized management greatly reduces the burden on end users in managing their equipment or network and provides an application service provider 98 through the service management center 201 the ability to optimize service delivery.

As previously mentioned, FIG. 1 demonstrates the exemplary network configuration. Broadly speaking the major components of the exemplary system are gateway device 10 which is connected to services management center 201 and thereby application service provider 98 via a wide area network, such as, by way of example, IP network 99. Furthermore, the exemplary system has gateway device 10 located on the user premises 70 associated with various endpoint devices 11.

As discussed in more detail below, the novel system architecture of the exemplary network configuration as shown in FIG. 1 allows for the management of services for the gateway device 10 and endpoint devices 11 and facilitates the easy addition of new services or modification of existing services on the gateway 10 and endpoint devices 11 via application service provider 98 through service management center 201. Such services may include, for example, facility management (home automation), media content downloading and Digital Rights Management (DRM), device updates, data backups, file sharing, media downloading, and transmission. All these services may be provided, from the user's perspective, without the intermediary of a plurality of external service providers who may typically provide these individual services for every endpoint device 11 in the user premises 70; rather, the user may receive, through the system architecture, application services for all these devices, which application services may be managed through the system architecture by a network service provider.

The software/firmware for these services resides in the gateway device 10. The gateway device 10 is integrated with hardware and software modules and respective interfaces that handle all aspects of home automation and digital endpoint service and management for the home in a manner without having to rely on external service providers and in a manner that is essentially seamless to the user. This is advantageously provided by the service management center 201 which is able to access regions of the gateway device 10 that are not accessible to the user for controlling the transport and storage of digital content and enabling service applications and upgrades that provide largely invisible support for many tasks performed by users through their endpoint devices 11.

As seen in FIG. 1, the gateway device 10 connects the various endpoint devices 11 together for enabling the user to experience a connected digital home, where information from one endpoint device 11 (for example voicemail from SIP Phone 40) can be viewed and acted on at another endpoint device 11 (for example the TV 32). In addition, the gateway device 10 maintains the operational status of endpoint devices 11 associated with the gateway to determine whether the endpoint devices 11 are online or offline. The gateway device 10 thus hosts the various in-home endpoint devices 11 and facilitates the moving of information from one endpoint device 11 to another endpoint device 11. Some of the in-home endpoint devices 11 processing duties performed by the gateway device 10 include, but are not limited to, 1) detecting new devices and provide IP addresses dynamically or statically; 2) functioning as a (Network Address Translator) NAT, router and firewall; 3) providing a centralized disk storage in the home; 4) obtaining configuration files from the service management center and configuring all in-home devices; 5) acting as a registrar for SIP-based devices; 6) receiving calls from and delivering calls to voice devices, providing voicemail services; 7) decrypting and securely streaming media having digital rights management encoding; 8) distributing media to an appropriate endpoint device; 9) compressing and encrypting files for network back-up; 10) backing-up files to the service management center, to other elements within the system, or other off-site storage centers provided by third parties directly from the gateway device; 11) handling home automation schedules and changes in status; 12) providing in-home personal web-based portals for each user; 13) providing parental control services (e.g. URL filtering, etc.); 14) creating and transmitting billing records of endpoint devices 11 including, recording and uploading multi-service billing event records; 15) distributing a PC client to PCs 30a, . . . , 30c in the home, used in support of the various services such as monitoring events or diagnostic agents; 16) storing and presenting games that users and buddies can play; 17) delivering context-sensitive advertising to the various endpoint devices 11; 18) delivering notifications to the endpoint devices 11; and 19) enabling remote access through the web and Instant Messaging (IM) as an example. Other duties the gateway device 10 may perform include: service maintenance features such as setting and reporting of alarms and statistics for aggregation, perform accessibility testing; notify a registration server (and location server) of the ports it is "listening" on; utilize IM or like peer and presence communications protocol information for call processing and file sharing services; receive provisioning information via the registration server; utilize a SIP directory server to make/receive calls via the SBC network element to/from the PSTN and other gateway device devices; and download DRM and non-DRM based content and facilitating the DRM key exchanges with media endpoints.

As will be described in greater detail herein below, the service management center 201 generally provides a communications and processing infrastructure for supporting the variety of application services and related communications residing at the gateway devices 10, $10_1$ . . . $10_n$. In an exemplary embodiment, this infrastructure may be configured to provide a secure environment and may be IP-based. Preferably, this support architecture is designed for high availability, redundancy, and cost-effective scaling.

The application service provider 98 in conjunction with the service management center 201, depicted in FIG. 1, manages application services for a number of gateway devices 10, $10_1$ . . . $10_n$ located at various users' premises 70. Connectivity for the various gateway devices 10, $10_1$ . . . $10_n$ to the service management center 201 and thereby the application service provider 98 is provided, in one embodiment, via a WAN termination interface, such as Ethernet WAN 53 over a broadband connection via the IP network 99, or, for example, via a wireless EvDO (Evolution Data Optimized) Internet data interface embodied as a PCMCIA (personal computer memory) wireless card 56, or a WiMax interface.

The gateway device 10 includes both a hardware and software infrastructure that enables a bridging of the WAN and LAN networks, e.g. a proxy function, such that control of any endpoint device 11 at any user premises 70 via the gateway device 10 using, optionally, a secure peer and presence type messaging infrastructure or other communications protocols, e.g. HTTPS. For example, as seen in FIG. 1, via any IM capable device or client 80a, 80b respectively connected with an IM or XMPP (Extensible Messaging and Presence Protocol) network messaging infrastructure, e.g. IM networks 99a, 99b such as provided by YAHOO, MICROSOFT (MSN), SKYPE, AMERICA ONLINE, ICQ, and the like, a user may access any type of functionality at a subordinate digital endpoint device 11 at and user premises 70 via the gateway devices 10, $10_1$ . . . $10_n$ and service management center 201 by simple use of peer and presence messaging protocols. In one exemplary embodiment, a peer and presence communications protocol may be used such as Jabber and/or XMPP. Particularly, Jabber is a set of streaming XML (Extensible Markup Language) protocols and technologies that enable any two entities on the Internet to exchange messages, presence, and other structured information in close to real time. The Internet Engineering Task Force (IETF) has formalized the core XML streaming protocols as an approved instant messaging and presence technology under the name of XMPP (Extensible Messaging and Presence Protocol), the XMPP specifications of which are incorporated by reference herein as IETF RFC 3920 and RFC 3921. Thus, the gateway device is provided with functionality for enabling a user to remotely tap into and initiate functionality of a digital endpoint devices 11 or the respective applications of the endpoint devices 11 at the premises via the IM networks 99a and 99b.

In addition, the gateway device 10 and network connectivity to the novel service management center 201, provides, in a preferred embodiment, a secure peer and presence messaging framework, enabling real-time communications among peers via other gateway devices $10_1 \ldots 10_n$. For instance, the device 10 provides the ability to construct communication paths between peers with formal communications exchanges available between, for example, one gateway device $10_1$ at user premises 70, and a second gateway device $10_n$ located at user premises $70_n$. Thus, such an infrastructure provides for content addressing, enabling peers through remote gateway devices $10_1 \ldots 10_n$ to supply and request content such as files, media content or other resources of interest to a community of interest.

Figure 2:
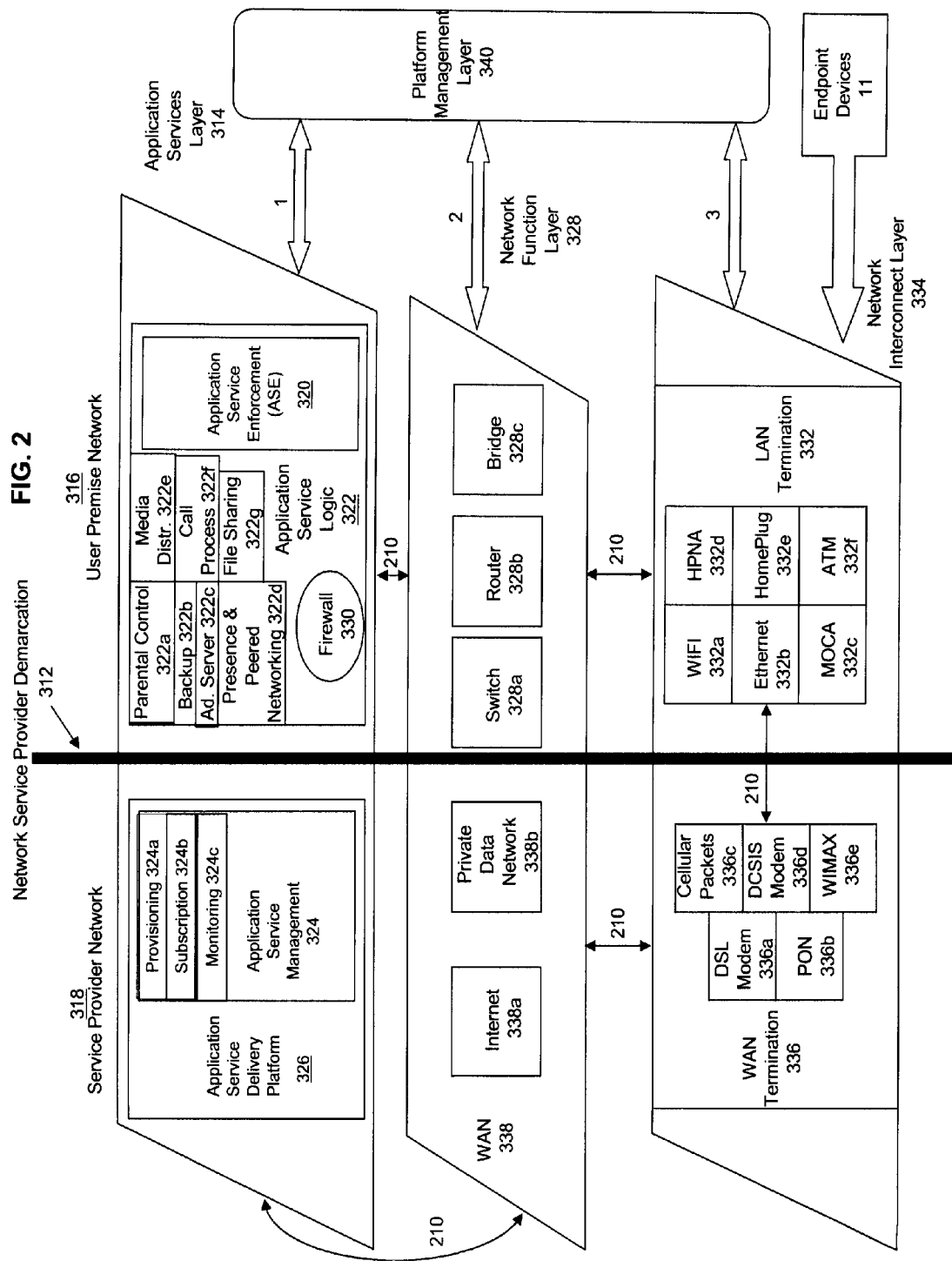
FIG. 2 is a high-level block diagram of an embodiment of the architecture of the exemplary system showing the demarcation between a gateway device and the service management center in reference to a network service provider demarcation.

To further demonstrate the novel architecture between the gateway device 10 and service management center 201 reference to FIG. 2 is now made. FIG. 2 is a high-level block diagram of an embodiment of the architecture of the exemplary system showing the demarcation between a gateway device 10 and the service management center 201 in reference to a network service provider demarcation 312. The logical network service provider demarcation 312 is formed at the edge of the wide area network at the user premises, between the wide area network and the equipment in the user premises. In a typical scenario, a network service provider takes responsibility for managing resources on the network side of the network service provider demarcation 312, leaving the user to manage everything on the user premises side. However, the gateway device 10 is implemented in such a manner as to offer its user many of the applications services, that were previously offered from network-side servers, from the user premises.

FIG. 2 shows that, in the exemplary architecture, many of these application service functionalities that were previously offered from the service provider network 318 exist across the network service provider demarcation 312 and logically reside at the application services layer 314 in the user premises network 316 on the hardware components located in the gateway device 10. In particular, the software/firmware that implements application services is logically positioned on the user premises network 316 of the network service provider demarcation 312.

The application services layer 314 shown in FIG. 2 represents the functional layers that provides access to applications services by application clients. These application services exist on a managed application service delivery platform (ASD) 326. The ASD 326 may include three functional modules, namely the application service enforcement (ASE) module 320, the application service logic (ASL) module 322, and the application service management (ASM) module 324.

On the user premises network 316 with respect to the ASD 326, the application services layer 314 includes the ASL module 322 which executes the application services that the gateway device 10 or endpoint devices 11 request. Such services may include parental control 322a, backup 322b, advertising server 322c, presence and peered networking 322d, media distribution 322e, call processing 322f, and file sharing 322g. Also, on the user premises network 316 with respect to the ASD is the ASE module 320. The ASE module 320 is responsible for enforcing the relevant application privileges to the application services. The ASE module 320 and the ASL module 322 must interact with each other so that the ASL module 322 can provide access to the client applications that have passed the policy enforcement procedures set forth in the ASE module 320. Additionally, a firewall 330 to protect the application client from application level attacks from the open Internet is located on the user premises network 316 within the application service layer 314.

Other elements shown in FIG. 2 that may reside in the gateway device 10 and logically positioned on the user premises network 316 include a network function layer 328 comprised of, but not limited to, a switch 328a, router 328b and/or a bridge 328c. The switch, router and bridge may optionally reside outside of the gateway device 10 and the functions thereof be performed elsewhere. Additionally, a LAN termination interfaces 332 located within the network interconnect layer 334 on the user premises network 316 may optionally include, but not be limited to the following interfaces: WiFi 332a, Ethernet 332b, Multimedia Over Coax Alliance (MOCA) 332c, Home Phoneline Networking Alliance (HPNA) 332d, HomePlug 332e, and Asynchronous Transfer Mode (ATM) 332f. Other interfaces currently known or to be developed may be included. The various LAN termination interfaces 332 allows bi-directional network layer communications on the user's side of the premises with one or more of the associated endpoint devices 11.

FIG. 2 also shows the WAN termination interfaces 336 at the network interconnect layer 334 on gateway device 10, but on the service provider network 318 side of the network service provider demarcation 312. The WAN termination 336 may include, but not limited to the following interfaces Digital Subscriber Line (DSL) modem 336a, Passive Optical Network (PON) 336b, cellular packets 336c, Data Over Cable Service Interface Specification (DCSIS) modem 336d, and Worldwide Interoperability for Microwave Access (WiMAX) 336e. Other interfaces now known or to be developed may be included. The WAN termination 336 provides connectivity to the wide area network (WAN) 338 at the network function layer 328 on the service provider network 318. The WAN 338 may include, but not limited to, the Internet 338a and a private data network 338b, for example. The WAN termination 336 enables bi-directional network layer communications for the associated endpoint devices 11 via a WAN and enables bi-directional communications between the gateway device 10 and the service management center 201 via the WAN.

With further reference to FIG. 2, the core of the logical capacities of the service management center 201 resides on the Service provider network 318, and is depicted as the Application Service Management (ASM) 324 portion of the application service delivery platform 326 in the application services layer 314. The ASM module 324 is implemented in the service management center 201, which is external to the user premises, and on the service provider network 318 side of the network service provider demarcation 312. The ASM module 324 may include functions such as provisioning 324a, subscription 324b, and monitoring 324c, for example.

Examples of various ASM module 324 functionalities performed at the service management center 201, from the service provider network 318 regime, include but are not limited to, initializing service in the gateway devices, providing security for the gateway devices and the network support infrastructure, enabling real time secure access and control to and from the gateway devices, distributing updates and new service options to the gateway devices, providing service access to and from the gateway devices and remote access to the gateway devices, for example. In support of these services, the service management center 201 provides the following exemplary additional services and features: authentication, multi-service registration, subscription control, service authorization, alarm management, remote diagnostic support, billing collection and management, web services access, remote access to gateway devices (e.g. via SIP or Internet/ web based communications), reachability to access challenged gateway devices, software updates, service data distribution, location service for all services, SIP VoIP service, media services, backup services, sharing services, provisioning, gateway interfaces to other service providers (northbound and peering), load balancing, privacy, security, and network protection.

The logical network architecture for the service management center network 201 delivering these capabilities is illustrated and described in greater detail in the above-identified related applications.

The ASM module 324 is operable to provide the necessary data to the ASE 320 and ASL modules 322 for them to carry out their respective functions. Specifically, the ASE module 320 receives the policies and permissions of each application client from the ASM module 324 (such as provisioning data and subscription data) and enforces those policies against the requested actions by the client application. Furthermore, the ASL module 322 may interact with the ASM module 324 for monitoring purposes and status information such as call data recording and billing. The ASM module 324 also manages the overall security and integrity of the ASD 326.

Furthermore, the ASL module 322 and ASE module 320 maintain logical connectivity or interaction with the ASM module 324 in the service management center 201, typically via communication through WAN 338. This logical connectivity is established through an always-on (or on an as needed, periodic basis), secure control channel 210 between the application services layer 314 (ASL and ASE) of the user premises network 316 and the application services layer 314 (ASM) of the service provider network 318. The control channel 210 is established through the network function layer 328 and the network interconnect layer 334. Through the control channel 210, the service management center 201 communicates with one or more of the gateway devices 10 thereby providing an infrastructure to support and/or manage the application services offered to endpoint devices 11 and their users by logic implemented in the gateway device(s). This logic is called the gateway operational management software and will be further described below. Effectively, the ASD 326, considered in its entirety, extends all the way from the service provider network 318 to the user premises network 316 by traversing the network service provider demarcation 312.

FIG. 2 also introduces a logical platform manager layer 340 to the user premises network 316, which allows for inter-layer allocation of local resources. The platform manager layer 340 guarantees access between the ASL module 322 on the user premises network 316 and the ASM module 324 in the service management center 201 by assuring that the local user premises hardware and software modules are functioning at a required state (CPU and memory usage, bandwidth usage, QoS settings, etc.) in order for the ASL module 322 to have the necessary resources to establish its required communications path to the ASM module 324. Note that the ASE, ASL and ASM modules are only examples of functions that may be logically bundled; other bundles, and other means of bundling these functions, are possible.

The platform manager layer 340, seen in FIG. 2, is also responsible for implementing that part of the managed application services to be performed by the gateway device 10. In that regard, the platform manager layer 340 secures and manages the overall hardware platform, given that in this scenario, the network function layer 328 and the application services layer 314 reside on one hardware platform. This secure hardware platform provides a robust and secure operating environment for the application services layer 314. Thus, to establish a secure and robust hardware operating environment, the platform manager layer 340 must interface (represented by arrows 1, 2, and 3) with all the layers above it and allow for bi-directional operational information flow among all of the functions including application services.

Application services represent functionalities, implemented in the upper layer(s) of the protocol or logical stack above the network layer(s) that may extend up to the application layer (layer 7 of the OSI model). An application service, for example, provides application server communication with a client functionality of one or more endpoint devices, for the respective service, communicated on top of network layer communications through the interfaces. In the exemplary system, the services are provided on a subscription service basis to users at the premises. The ASE module 320 provides enforcement regarding authorization, authentication, configuration, and/or use of the respective application service via the endpoint devices 11. The application service includes service and feature functions, implemented and controlled by the ASL module 322. Management of the application service is based on communications with the ASM 324 housed within service management center 201 via the WAN 338.

Examples of application services include, but are not limited to one or more of: media delivery, content management, access control and use tracking, file sharing, and protection and back-up services of both Internet/Web-generated digital media content and user generated digital media content. The disclosed gateway 10 device thus is configured and programmed to simplify various aspects of managing the emerging home/business digital networks including the myriad of interconnected digital endpoint devices 11 associated with the gateway device 10. The endpoint devices 11 need not reside within, or be located at, the premises to maintain their association with the gateway device 10. Application service functionality of the gateway device 10, as provided by the exemplary system, is enabled/disabled and configured by an application service provider 98 (FIG. 1), via communications between the gateway device 10 and the service management center 201.

As shown by the discussion of FIG. 2, application service software/firmware is logically positioned on the user premises network 316, that is to say on the user premises side of the network service provider demarcation 312. The gateway device 10 software/firmware however, also defines a logical service provider-user demarcation between the user premises and the application service provider, as will be described in more detail with regard to FIG. 3.

Thus referring to FIGS. 1 and 2, the gateway device 10 and service management center 201 move substantial functions performed by the typical network server into the user premises by incorporating those functions in a way that allows for the server functionality to be externally managed by the service management center 201 which may be operated by a third-party service provider such as an application service provider 98. In this exemplary system, both the server functionality and the application services offered via the gateway device 10 may be managed by the service management center 201. Moreover, the server function residing in the gateway device 10 is not only located on the user premises but it now resides logically on the user premises side of the network service provider demarcation 312 and on the service provider side of the applications service provider demarcation 392 (see further discussion below in reference to FIG. 3).

Figure 3:
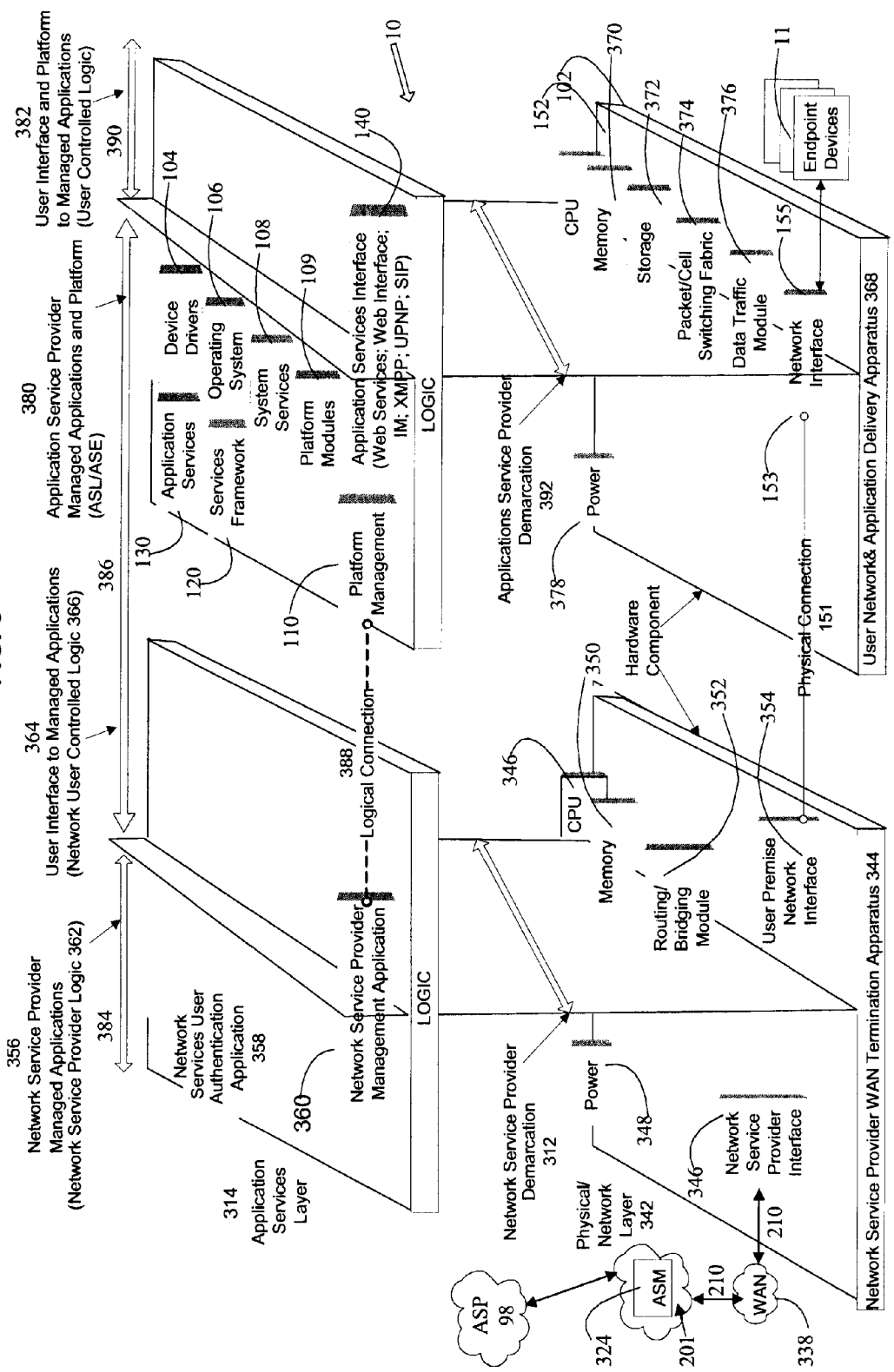
FIG. 3 is a high-level block diagram of an embodiment of the software and hardware components of a gateway device together with a network service provider termination apparatus, and shows a network service provider demarcation as well as an application service provider demarcation.

FIG. 3 is a high-level block diagram of an embodiment of the software and hardware components of a gateway device together with a network service provider termination apparatus 344, and shows a network service provider demarcation 312 as well as an application service provider demarcation 392. At the physical/network layer 342, the drawing shows an example of user premises hardware components required for delivering data services (i.e. Internet connectivity) along with a separate, non-integrated managed hardware used in delivering a set of managed application services (e.g. IM, VOD, IP telephony). The Network Service Provider Wide Area Network Termination Apparatus (NSP-TA) 344 allows for a typical termination of WAN 338 at a network service provider interface 346 for such services as DSL, cable, and fiber. Additional components within the NSP-TA 344 may include a CPU 346, power 348, memory 350, routing/bridging module 352, and a user premises network interface 354, for example. The NSP-TA 344 may be an existing user-premises device, provided by the carrier supplying network services to the premises. FIG. 3 also depicts the network service provider demarcation 312 at the hardware level.

In order for network service providers to deliver managed services, they typically require a management element controlled by the CPU 346 on the NSP-TA 344. To depict these logical elements residing on the hardware components, FIG. 3 includes a representation of the application services layer 314 above the physical/network layer 342. This layer corresponds to the application services layer 314 of FIG. 2, but without reference to any logical elements residing at the network services provider. The management element, represented by the network service provider managed application 356, allows the network service provider to determine the status of the network hardware device and interfaces as well as maintain a certain degree of security enforcement at the customer premises.

As noted, the network service functionality is at the network interconnect layer 334 and network function layer 328 (displayed in FIG. 2) and generally does not extend to the application services layer 314 beyond basic authentication, authorization and state management as depicted by network services user authentication application module 358. As with the hardware components, the logical elements also have a network service provider demarcation 312. On the WAN side, depicted as the network service provider managed applications 356 side, of the network service provider demarcation 312, resides within the network service provider management application module 360 the applications that are managed by the network service provider logic 362. The network service provider logic 362 allows the network service provider the exclusive control over the applications within the portion of the network service provider management application module 360 that are logically on the network service provider managed applications 356 side.

The user interface to managed applications 364 is present on the LAN side of the network service provider demarcation 312 within the application services layer 314. Within this interface resides software/firmware and logic available to users other than the network service provider referred to as the network user controlled logic 366. The network user controlled logic 366 provides a user interface to the network service provider logic 362 and, to the extent permitted by the network service provider logic 362, interaction with or communication between the user and network service provider through the network user controlled logic 366 and the network service provider logic 362, and to the NSP-TA 344 hardware components. The network user controlled logic 366 allows the user of the NSP-TA 344 to make certain minimal software/firmware changes relevant to their preferences (e.g., user name and password changes, local IP addresses changes, local interface selection). All user devices typically can only communicate with the NSP-TA 344 through one or more of the user premises network interfaces 354. The user can modify the network user controlled logic 366 through the user premises network Interface 354. The network service provider demarcation 312 is typically within the NSP-TA 344, logically dividing the network service provider interface 346 and the user premises network interface modules 354. The network service provider does not have any in-depth visibility or significant responsibility beyond the network service provider demarcation 312.

Additionally, shown on the right hand side of FIG. 3 is the User Network and Application Delivery Apparatus (UNA-DA) 368, which is depicted as a separate managed gateway device 10 (but as described below may optionally be combined with elements of the NSF-TA 344) that a managed-service provider (which may be different than the network service provider) would control in delivering a set of application services to the user premises 70 (FIG. 1). FIG. 3 illustrates the logical architecture of the software and hardware of the gateway device 10 together with a NSP-TA 344 for broadband connection to WAN 338. The gateway device 10 is an application delivery apparatus, for delivering application services to endpoint devices 11 using network layer communications through the network interface 153. FIG. 3 also illustrates two relevant demarcations and a termination which delineate control/management access with respect to the functionalities of the gateway device 10. To be described further below, FIG. 3 shows the arrangement of the ASL module 322 and the ASE module 320 of FIG. 2 as being logically positioned between these two demarcations which results in significant management control by the application service provider 98 and relieve the user of significant burdens in arranging and configuring the systems/services at the user premises 70 (FIG. 1).

With respect to the two demarcations 312 and 392 shown in FIG. 3, one of the demarcations as outlined above is the network service provider demarcation 312. To identify the separation of, and distinguish between, the software/firmware and hardware components subject to control by the application service provider 98 and those subject to control by the user at the user premises, FIG. 3 identifies a dividing line across the logical elements of the UNA-DA 368, and a corresponding dividing line across hardware components, referred to as the applications service provider demarcation 392. The arrows at the top of FIG. 3 thus show the delineations in management responsibility created by the two logical demarcations 312 and 392. The covered area to the left of the network service provider demarcation 312 as depicted by arrow 384 is the network service provider's responsibility. By contrast, the area covered by arrow 390 which represents anything to the right of the application service provider demarcation 392 is the end user's responsibility. However, the logic and hardware between these two demarcations, as depicted by arrow 386, is the application service provider's 98 responsibility. This arrangement of two demarcations and the attendant logical demarcations in management access to the hardware resources at the premises result in significant management control by the application service provider 98 and relieve the user of significant burdens in arranging and configuring the systems/services at the premises.

It should be noted that the logical connection 388 between the network service provider management application 360 and the platform management 110 may be provided to the NSP-TA 344 to enable the application service provider 98 to assume any user's responsibility in managing the network user control logic 366 of the NSP-TA 344. Therefore, the end user would no longer be responsible for managing any element with respect to the NSP-TA 344.

Referring to FIG. 3, the managed gateway device 10 is composed of several elements at both the physical/network layer 342 and the application services layer 314. At the physical/network layer 342, the device 10 includes its own dedicated CPU 152, memory 370, packet/cell switching fabric 374, data traffic module 376 and power 378 as well as its own dedicated set of interfaces. The UNA-DA 368 includes one or more network interfaces 153 providing connectivity to the NSP-TA 344 as well as to user premises endpoint devices 11. One skilled in the art will readily recognize, however, that the physical connection 151 that connects the UNA-DA 368 to the NSP-TA 344 also provides connectivity for the UNA-DA 368 to the WAN 338, and is the means by which the UNA-DA 368 accesses the WAN 338.

Programming elements of the UNA-DA 368 in the gateway device 10 are depicted at the application services layer 314 of the UNA-DA 368. The software/firmware corresponding to the ASL module 322 and the ASE module 320 of FIG. 2 reside on the application service provider managed applications and platform 380 (FIG. 3). The application service provider managed applications and platform 380 is managed by the managed application service provider 98 in conjunction with the service management center 201 housing the ASM module 324. The application service provider 98 accesses the application service provider managed applications and platform 380 by means of control channel 210 through the WAN 338.

Other logical elements that form the application service provider managed applications and platform 380 include, but are not limited to, device drivers 104, operating system 106, system service 108, and platform module 109. These logical elements are described with respect to FIGS. 4A and 4B below. Another logical element that forms the application service provider managed applications and platform 380 includes the application service interface 140. The application service interface 140 enables communications from user endpoint devices 11 with the application service provider managed applications and platform 380.

The application service provider managed applications and platform 380 includes a platform management module 110 that, with other software/firmware in the platform and the ASM 324, allows the managed application service provider 98 to control the hardware elements of the UNA-DA 368 in addition to other relevant application services logic or hardware that may reside on the user premises. For example, this software/firmware enables a managed application service provider 98 to control and manage the hardware elements on the UNA-DA 368 to ensure proper use and allocation of the UNA-DA's processing, memory, storage, and bandwidth, to monitor local hardware security and generate needed alarms or protection sequences, and to prioritize applications based on a set of established policies. The user would have control over specific parameters of application services obtained through the UNA-DA 368, through the user interface and platform to managed applications 382 shown in FIG. 3. These parameters allow the user to control the local behavior of the interfaces and to configure the specific applications to implement the user preferences for those applications.

The application service provider 98 can interact with the network service provider's managed applications through the network service provider management application 360. This is an optional function but it helps show how the gateway device 10 can interface with a network device, such as the NSP-TA 344, from a network service provider, and provide a unified application interface. The logical connection 388 represent this management relationship between platform management logic module 110 in the gateway device 10 and the network service provider management application 360 in the NSP-TA 344. In effect, the application service provider 98 manages the NSP-TA 344 for the user, even though it is not the application service provider's hardware. In the case where the application service provider is a network service provider as well, then it would work in practically the same way. If the NSP-TA is the application service provider's own hardware, the degree of integration and control can be elevated even more.

FIG. 3 also shows how the software/firmware elements on the gateway device 10 effectively partitions the hardware at the application service provider demarcation 392, which gives the application service provider 98 the ability to provide a managed Peer-to-Peer private service that will enable that provider to use the gateway device 10 for performing distributed computing, search, indexing, file backup, sharing, etc., all managed and controlled by the application service provider 98 through service management center 201.

In another embodiment, the two hardware regimes described above (NSP-TA 344 and the UNA-DA 368) may be combined into one managed hardware platform. This would in effect replace the "user" access with a managed "machine" access, for aspects of the NSP-TA 344, as well as aspects of the application services offered through the UNA-DA 368. Thus, the combination creates an integral gateway device 10 providing both network service and application services, under centralized management. Although integrated, network interconnect functions of the NSP-TA 344 may still be managed by the network service provider, as in the example of FIG. 3. Those skilled in the art will readily see additional suitable combinations and configurations for the hardware comprising the NSP-TA 344 and the UNA-DA 368. For example, in a further embodiment, all the hardware dedicated to the network service provider interface 346 may reside and be integral with the hardware comprising the UNA-DA 368. Thus, the network service provider interface 346 may reside on the UNA-DA 368.

Figure 4A:
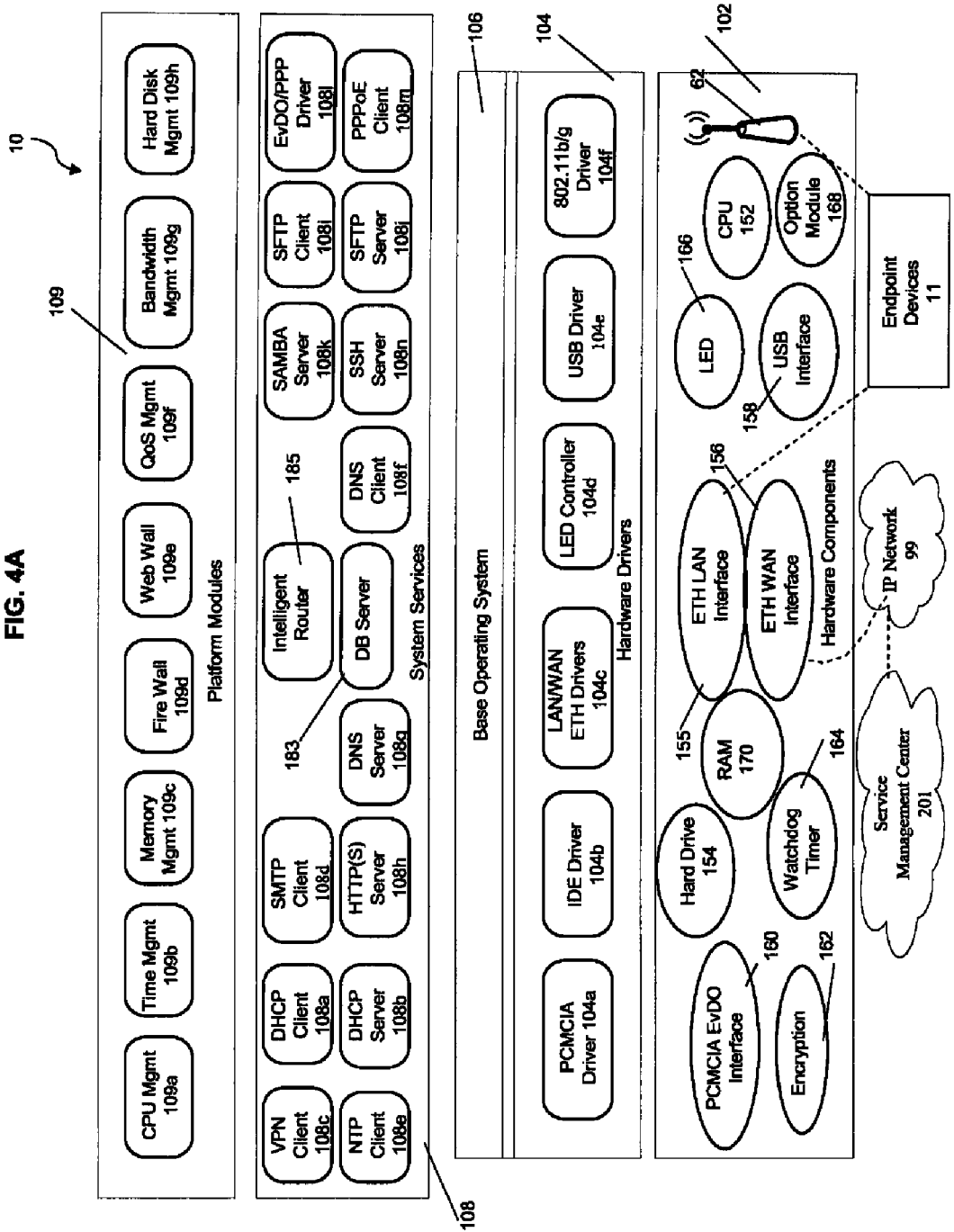
FIGS. 4A and 4B are more detailed logical diagrams of an embodiment of an exemplary gateway device.
Figure 4B:
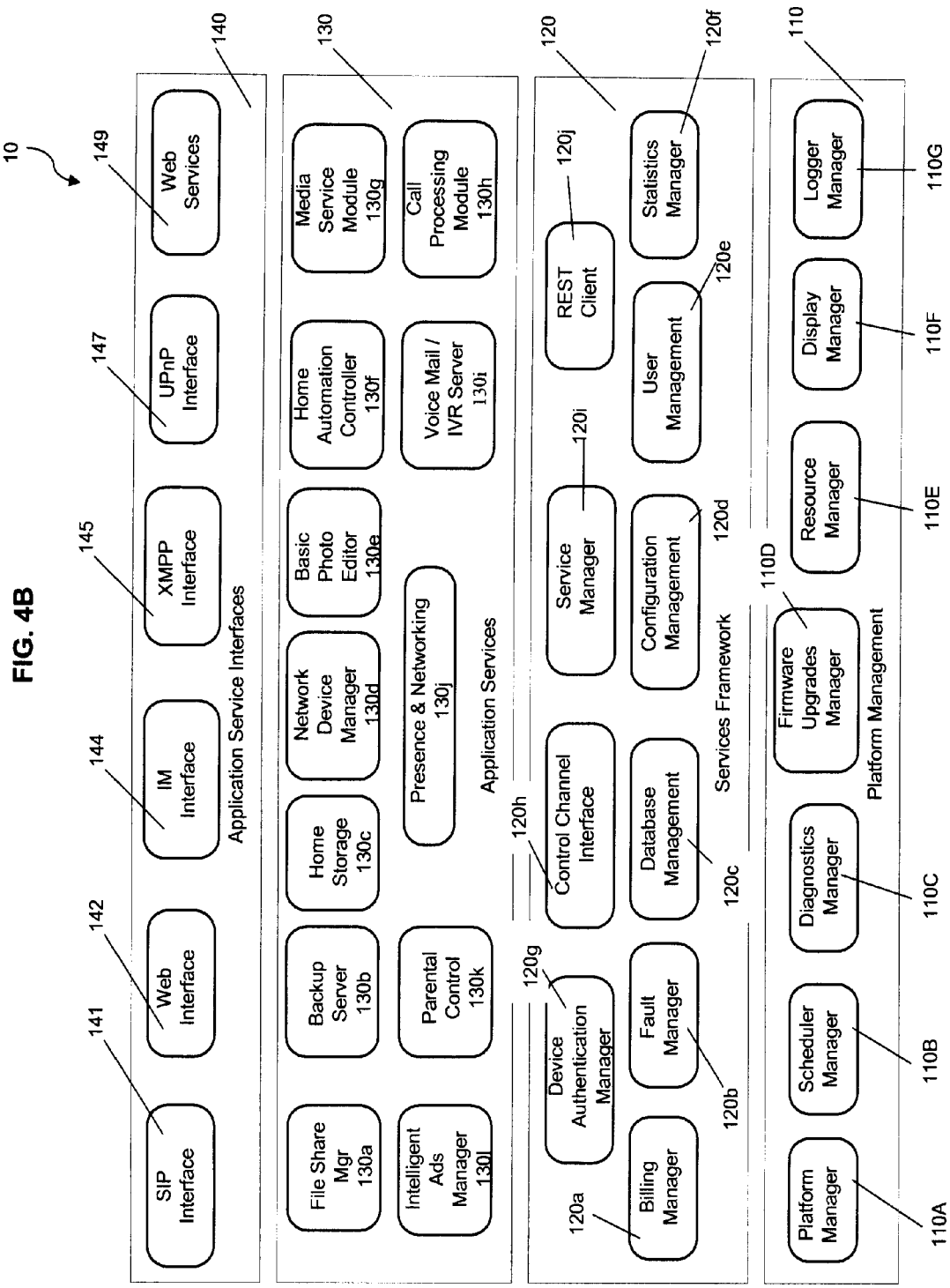

The composition of the premises gateway device 10, earlier described with reference to FIG. 3, is now described in greater detail with reference to FIGS. 4A and 4B. FIGS. 4A and 4B are more detailed logical diagrams of an embodiment of an exemplary gateway device 10. As shown in FIGS. 4A and 4B, the gateway device 10 utilizes a layered architecture, which enables the encapsulation of similar functionality and the minimization of dependencies between functions in different layers. FIG. 4A shows the lower portion of the layered architecture, and FIG. 4B shows the upper portion of the layered architecture. The completed set of layers can be conceptualized as if FIG. 4B was combined with FIG. 4A, with the layers of FIG. 4B above those of FIG. 4A. FIGS. 4A and 4B also depict exemplary functionality (hardware and logical) resident in each of the layers.

The layered architecture includes, but not limited to, a hardware components layer 102, hardware driver layer 104, base operating system layer 106, system services layer 108, platform modules layer 109, platform management layer 110, services framework layer 120, application services layer 130, and application services interfaces layer 140. These layers combined represent the layered architecture of the exemplary gateway device 10.

An overview of FIGS. 4A and 4B made in reference to FIGS. 2 and 3 is provided for orientation purposes. The logical elements of the network interconnect Layer 334 residing on the gateway device 10 (FIG. 2) are found in the hardware drivers layer 104 in FIG. 4A, which govern the operation of the hardware components layer 102. The processor runs a base operating system shown in FIG. 4A at layer 106, which plays a role in each of the network interconnect 334, network function 328, application services 314 and platform manager layer 340 (FIG. 2). Logical elements represented by the network function layer 328 (FIG. 2) comprise elements from the system services layer 108 (FIG. 4A). In a similar fashion, the platform manager layer 340 (FIG. 1) is implemented in the exemplary architecture of FIGS. 4A and 4B by the platform modules 109 and the platform management layer 110. Particular logical elements comprising the ASL module 322 and ASE module 320 of the application services layer 314 (FIG. 2) are shown in FIG. 4B as comprising logical elements from each of services framework 120 and application services 130. The layered architecture displayed in FIG. 4B facilitates reuse or sharing of logic across the layers to provide a managed services framework 120. Finally, application services interface 140 enables communications from user endpoint devices 11 (FIG. 1) within their respective service environments.

As shown in FIG. 4A, the hardware components layer 102 includes a central processing unit (CPU) 152, which may be a system on a chip that includes processing elements, digital signal processor resources and memory. The implementation of functions and the related control such as a router (with quality of service (QoS)), firewall, VoIP gateway, voice services and voice mail may be embodied and performed within the CPU 152.

The CPU 152 is also coupled to a random access memory (RAM) 170 and additionally, non-volatile hard drive/disk magnetic and/or optical disk memory storage 154. Generally, the hard drive/disk magnetic and/or optical disk memory storage 154 provides non-volatile storage of computer readable instructions, data structures, program modules, objects, service configuration data and other data for use by the gateway device 10. The non-volatile hard drive/disk magnetic and/or optical disk memory storage 154 may be partitioned into a network side which is the repository for storing all of the service logic and data associated with executing services subscribed to by the user, and, is invisible to the user, and, a user side for storing user generated content and applications in which the user has visibility. Although not shown, the CPU 152 may be coupled to a microcontroller for controlling a display device and/or other devices.

Additional hardware components include one or more Ethernet LAN and WAN interface cards 155, 156 (e.g. 802.11, T1, T3, 56 kb, X.25, DSL or xDSL) which may include broadband connections (e.g. ISDN, Frame Relay, ATM, Gigabit Ethernet, Ethernet over SONET, etc.), wireless connections, or some combination of any or all of the above. For wireless connections, the cards would be associated with WiFi LAN access point 62 to enable a wireless connection. The Ethernet LAN interface 155 provides data communication connectivity within the user premises, essentially, for communication with any endpoint devices operating within the premises. The Ethernet WAN interface 156 provides data communication connectivity for the gateway device 10 and endpoint devices 11 (not shown) communicating through the device 10, with the wide area network like IP network 99 shown in FIG. 1.

For additional or alternative customer premises communications, the hardware components 102 may also include one or more USB interfaces 158. Furthermore, for additional or alternative communications with the wide area network, the hardware components may also include the PCMCIA EvDO interface card 160.

A data encryption/decryption unit 162 is additionally provided as part of the architecture for providing data security features. A watchdog timer element or like timer reset element 164 is provided to ensure the software/firmware on the device is operational. One or more LED devices 166 are included for indicating status and other usable information to users of the gateway device 10.

The hardware layer 102 may also include an option module 168. The hardware components at layer 102 have multiple interfaces for connection to such an option module 168. These interfaces, by way of example, could be a data bus (e.g. PCI, etc), network interface (e.g. Ethernet (RJ45), MoCA/HPNA (Coax)) and Power feeds. The option module 168 allows additional functionality to be added to the gateway device 10 at the hardware layer 102. For example, this additional functionality could be everything from support for a variety of extra WAN interfaces (e.g. xDSL, DOCSIS, Fiber (PON), cellular packet, WiMAX, etc.), media processing (e.g. Cable TV termination, Digital Video Recording, Satellite TV Termination, over-the-air broadcasting, etc), to voice processing (FXS, FXO, Speech Detection, Voice to Text, etc). The option module 168 may have its own standalone CPU, memory, inputs/outputs, storage, or provide additional functionality by its use of the CPU, memory, inputs/outputs, and storage facilities off of the other hardware layer 102 components. The option module 168 may be managed indirectly by the platform manager layer 340 (FIG. 2).

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

As further shown in FIG. 4A, the hardware drivers layer 104 comprises a multitude of driver interfaces including but not limited to: a PCMCIA driver 104a, for enabling low level communication between the gateway CPU 152 and the PCMCIA network interface card wireless interface, an IDE driver 104b for enabling low level communication between the gateway CPU 152 and the local mass memory storage element, and LAN/WAN Ethernet drivers 104c for enabling low level communication between the gateway CPU 152 and the respective network interface cards 155 and 156. The exemplary driver layer also includes, but not limited to an LED driver/controller 104d for driving LED(s) 166, a USB driver 104e allowing CPU 152 to communicate via USB interface 158, and an 802.11b/g (or n) wireless network driver 104f for allowing the CPU 152 to communicate via the WiFi LAN access point 62. The drivers provide the logical connectivity between the low level hardware devices 102 and the base operating system 106.

The base operating 106 controls the execution of computer programs and provides scheduling, input-output control, file and data management, memory management, and communication control and related services for the gateway device 10. With respect to the base operating system 106, the gateway device 10 architecture may support any embedded operating system, any real-time operating system, any open source operating system, any proprietary operating system, or even any operating systems for mobile computing devices as long as the operational needs of the client discussed herein below can be met. Exemplary operating systems that may be employed include WINDOWS, MACINTOSH, LINUX or UNIX or even an embedded Linux operating system. For instance, the gateway device 10 may be advantageously provided with an embedded base operating system 106 that provides operating system functions such as multiple threads, first-in first-out or round robin scheduling, semaphores, mutexes, condition variables, and message queues, for example.

Built upon the base operating system 106, as shown in FIG. 4A, is a system services support layer 108 providing both client-like and server-like functions that enable a wide range of functionality for the types of services capable of being managed by the gateway device 10. For instance, a Dynamic Host Configuration Protocol (DHCP) client 108a and server 108b software modules are provided. The DHCP client particularly requests via a UDP/IP (User Datagram Protocol/Internet Protocol (e.g., IPv4, IPv6, etc.) configured connection information such as the IP address that the gateway device 10 has been dynamically assigned by a DHCP service (not shown), and/or any the subnet mask information the gateway device should be using. The DHCP server dynamically assigns or allocates network IP addresses to subordinate endpoints 11 on a leased basis. A Virtual Private Network (VPN) client 108c may communicate via a proxy server in the service management center 201, according to a VPN protocol or some other tunneling or encapsulation protocol. An SMTP client 108d handles outgoing email over TCP (secure socket layer), in accordance with the Simple Mail Transfer protocol. SMTP server functionality may be added to handle and process incoming email. A Network Time Protocol (NTP) 108e (RFC 1305) generates and correlates timestamps for network events and generally provides time synchronization and distribution for the Internet. A Domain Name Server (DNS) client 108f and server 108g combination are used by the IP stack to resolve fully-qualified host or symbolic names, i.e. mapping host names to IP addresses.

An HTTP(S) server 108h handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client 108i and server 108j combination govern the ability for file transfer over TCP. A SAMBA 108k server is an open source program providing Common Internet Files Services (CIFS) including, but not limited to file and print services, authentication and authorization, name resolution, and service announcement (browsing). An EvDO/PPP driver 108l includes a Point-to-Point Protocol (PPP) daemon configuration for wireless broadband services. A PPPoE (Point-to-Point Protocol over Ethernet) client 108m combines the Point-to-Point Protocol (PPP), commonly used in dialup connections, with the Ethernet protocol. The PPPoE client 108m supports and provides authentication and management of multiple broadband subscribers in a local area network without any special support required from either the telephone company or an Internet service provider (ISP). The gateway device 10 is thus adapted for connecting multiple computer users on an Ethernet local area network to a remote site through the gateway 10 and can be used to enable all users of an office or home to share a common Digital Subscriber Line (DSL), cable modem, or wireless connection to the Internet. A Secure Shell or SSH 108n server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 108 is intelligent routing capability provided by an intelligent router device 185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway device 10. A central database server 183 handles all of the database aspects of the system. For example, the database server 183 maintains and updates registries and status of connected digital endpoint devices 11 (FIG. 1), maintains and updates service configuration data, services specific data (e.g. indexes of backed-up files, other service specific indexes, metadata related to media services, etc.) and firmware configurations for endpoint devices 11 (FIG. 1). The database server 183 may also store billing and transaction detail records and performance diagnostics. The database server logic 183 also satisfies all other database storage needs as will be described in greater detail herein.

Built on top of the system services layer 108 is the platform module layer 109 as seen in FIG. 4A. The platform module layer 109 provides a software framework for base operating system layer 106 and communications level platform functionality such as CPU management 109a, timer management 109b, memory management functions 109c, a firewall 109d; a web wall 109e for providing parental control services via the web (e.g., HTTP, SMS (Short Messaging Service) and WAP (Wireless Access Protocol)), QoS management features 109f, bandwidth management features 109g, and hard disk drive management features 109h.

The layered architecture further provides a platform management layer 110 as shown in FIG. 4B, which together with the platform modules 109 implement the platform manager layer 340 discussed earlier (FIG. 2). In the layered architecture, the platform management layer 110 and elements shown above it in FIG. 4B are built upon the platform modules 109.

The features and functions in platform management layer 110 include a platform manager module 110a which provides a management of all the processes and services in the system and implements unique rules based notification services. On operational failure, for example, when one of the components or services fails, the platform manager module 110a would detect this failure and take appropriate action such as implement a sequence of rules to provide notification to a user, restart the service, and generate alarms, for example. Another module within platform management layer 110 is a scheduler manager module 110b. Scheduler manager module 110b manages scheduled device maintenance, managing scheduled services, e.g. back-up services, etc. The layer 110 also includes a diagnostics manager module 110c and a firmware upgrades manager module 110d for managing firmware upgrades. A resource manager module 110e manages system resources and digital contention amongst the various resources (e.g. CPU, memory, hard drive, and bandwidth utilization) within platform management layer 110. A display manager module 110f manages the LED status, and a logger manager module 110g store and track gateway log-in activity of users and applications, e.g. voice call logs, at the user premises.

The platform management layer 110 in concert with resource manager module 110e and the platform manager module 110a enforce the separation of network-side managed service control and user-side delegations depending upon service subscriptions and configurations. For example, the platform manager module 110*a* and resource manager module 110*e* encompass rules and guidelines provided according to subscribed services that act to enforce, manage, and control the input/output operations and use of hard drives space. Thus, the operation of the platform manager module 110*a* and resource manager module 110*e* help to determine the line between what is "owned by" the customer and what is "owned by" the application service provider thereby establishing the application service provider demarcation 392 as seen in FIG. 3.

In general, the logical platform management layer 110 allows for inter-layer allocation of local resources. This function guarantees access between the application services/management logic implemented at the higher layers of the architecture within the gateway device 10 and the applications service management function in the service management center 201, by assuring that the local user premises hardware and software modules are functioning at a required state (CPU and memory usage, bandwidth usage, QoS settings, etc.). The platform management layer 110 is also responsible for implementing that part of the managed application services to be performed by the gateway device 10. In that regard, the platform management layer 110 secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer 110 must interface with all the layers above it and allow for bi-directional operational information flow among all of the functions.

Referring back to FIG. 4B, built on top of the platform management layer 110 is the Services Framework Layer 120, which provides a library of application support service processes that facilitate data collection and data distribution to and from the endpoint devices (FIG. 1). The application support service processes include, but are not limited to, a device authentication manager 120*g* for use in authenticating devices connected to the gateway device and the user of the gateway device, a billing manager 120*a* for collecting and formatting service records and service usage by endpoint devices, (e.g., calls, back-up services etc.), a fault manager 120*b* for detecting and managing determined system and/or service faults that are monitored and used for performance monitoring and diagnostics, a database manager 120*c*, a control channel interface 120*h* via which the gateway initiates secure communications with the operations support infrastructure, a configuration manager 120*d* for tracking and maintaining device configuration, a user manager 120*e*, a service manager 120*i* for managing service configuration and firmware versions for subscribed services provided at the gateway device, and a statistics manager 120*f* for collecting and formatting statistics generated by different components in the gateway device 10. Statistics may relate to the use of one or more services and associated time-stamped events that are tracked. Finally, the layered service architecture shown in FIG. 4B additionally provides the gateway device 10 with intra-process communication and inter-process communication amongst the many services and modules in the service framework layer 120 that enables the provisioning, management and execution of many applications and services at the application services layer 130.

As seen in FIG. 4B, next to the Services Framework layer 120 is the application services layer 130 providing library of user application services and application support threads including, but not limited to, file share manager 130*a*, backup server 130*b*, home storage 130*c*, network device manager 130*d*, basic photo editor 130*e*, home automation controller 130*f*, media services module 130*g*, call processing module 130*h*, voice mail and interactive voice response (IVR) server 130*i*, presence and networking 130*j*, parental control 130*k*, and intelligent ads manager 130*l*.

The gateway device 10, shown in FIG. 4B, further provides application service interfaces 140 that are used to enable a variety of user applications and communications modalities. Furthermore, the application service interfaces 140 enable communications from user endpoint devices 11 (FIG. 1) within service environments. In that regard, the application service interfaces 140 enable the application services 130 to act as an appropriate server with respect to client device application or service functionality of the endpoint devices 11 (FIG. 1). The application service interfaces 140 also enable corresponding interfaces for the application services with aspects of service environments implemented outside the user premises. In that regard, the interfaces 140 enable the application services layer 130 to act as an appropriate client, for extending the application or service related communications to a server accessed via a wide area network, such as a server of the service management center 201 (FIG. 1).

Specific application service interfaces 140 might include a Session Initiation Protocol (SIP) Interface 141. SIP interface 141 is an interface to the generic transactional model defined by the session initiation protocol that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a session border controller element in the service management center 201 (FIG. 1).

Additionally, application service interfaces layer 140 may include the web interface 142 that enables HTTP interactions (requests and responses) between two applications. Also, the Web services interface 149 that provides the access interface and manages authentication as gateway device 10 access the service management center 201 via web services may be included in the application service interface layer 140. The IM Interface 144, which can optionally be located within the application service interface layer 140, is a client that enables the gateway device 10 to connect to one or more specific IM network(s). As further shown in FIG. 4B within the application service interface layer 140, the UPnP (Universal Plug and Play) interface 147 enables connectivity to other stand-alone devices and PCs from many different vendors.

The XMPP interface 145, within the application service interface layer 140, is provided to implement the protocol for streaming (XML) elements via the gateway device 10, in order to exchange messages and presence information in close to real time, e.g. between two gateway devices. The core features of XMPP interface 145 provide the building blocks for many types of near-real-time applications, which may be layered as application services on top of the base TCP/IP transport protocol layers by sending application-specific data qualified by particular XML namespaces. For example, the XMPP interface 145 provides the basic functionality expected of an IM and presence application that enable users to perform the following functions including, but not limited to, 1) exchange messages with other users, 2) exchange presence information with other devices, 3) manage subscriptions to and from other users, 4) manage items in a contact list (in XMPP this is called a "roster"), 5) block communications to or from specific other users by assigning and enforcing privileges to communicate and send or share content amongst users (buddies) and other devices, and 6) communicating with applications in the service management center and vice versa. The synchronization of allowed services and features and the real-time notification of service and configuration changes can be communicated through this interface.

The powerful processing, connectivity, and storage capability of the gateway device 10 in this novel architecture brings opportunities with regards to the generation, handling, and storage of operational information and the management thereof. Certain terms used herein are defined as follows. "Operational information" is data and their analysis related to billing, statistical information, alarms, and logs. "Management", familiar to one skilled in the art and used herein, means the actions and processes whereby a manager entity performs any one or more of the following functions in relation to a managed entity: access, direction of operation, security of accessibility, configuration, measurement of performance, and response to notifications from the managed entity. "Billing information", familiar to one skilled in the art and used herein, is information related to service utilization for the purpose of apply charging metrics or rating to a user's service utilization. "Statistical information", familiar to one skilled in the art and used herein, is metric information related to the operation of a system. "Alarm information", familiar to one skilled in the art and used herein, is information that is generated and then cleared or dismissed. "Log information", familiar to one skilled in the art and used herein, is historical records of the operation of the software typically stored in a log file.

The gateway device 10 provides an excellent scaling point within the exemplary system shown in FIG. 1 because each gateway device 10 within the system brings CPU processing power, Internet connectivity, and a large amount of storage capacity. However, since the service delivery may be performed directly between the gateway device 10 and the application service provider and does not transit the service management center 201, the service management center 201 may lack visibility into the service delivery function residing in the gateway device 10 and the associated operational information. This operational information is necessary to provide robust functionality that does not require sophisticated or inordinate attention from the user to manage provision and utilize them.

To efficiently and economically manage and use operational information from a large number of gateway devices 10, and for the service management center 201 to access the operational information, the gateway device 10 and service management center 201 must contain software/firmware that takes advantage of the gateway's capabilities and the opportunities brought on by the novel system. As mentioned, the gateway device 10 stores all the operational information it generates on its hard disk including the billing, alarms, statistical information, and logs. The gateway device's software/firmware stores the operational information in databases, log files, and other memory or storage assets and makes this information accessible to diagnostic software on the gateway device 10, to the user, to the application service provider 98, and service management center 201. By maintaining this information on each gateway device 10, the service management center 201 has access to operational information for each specific gateway device 10 without providing a large amount of centralized storage, processing, or bandwidth to carry the operational information to the service management center 201.

Because the systems disclosed herein is comprised of many user gateway devices 10 with powerful processing capabilities, external events affecting a large number of gateway devices 10 would cause the gateways to flood the service management center 201 with operational information. The servers in the service management center 201 or the control channel 210 to the gateway device 10 can become overloaded or even disabled under such an onslaught resulting in disruption of all users' service. Any software, device, or technique for transmitting operational information from the gateway to the service management center 201 must prevent this flooding. Likewise, since the service management center 201 maintains a control channel 210 to each gateway device 10, the operational information transmitting to service management center 201 can overwhelm service management center 201 when even a small number of gateway devices 10 send a large amount of operational information over the control channel 210. In this novel architecture, there is a need for a device and technique that can control, sample, and compress the operational information generated on the gateway device 10 and its connected endpoint devices 11 and subsequently transmitted to the service management center 201.

Figure 5:
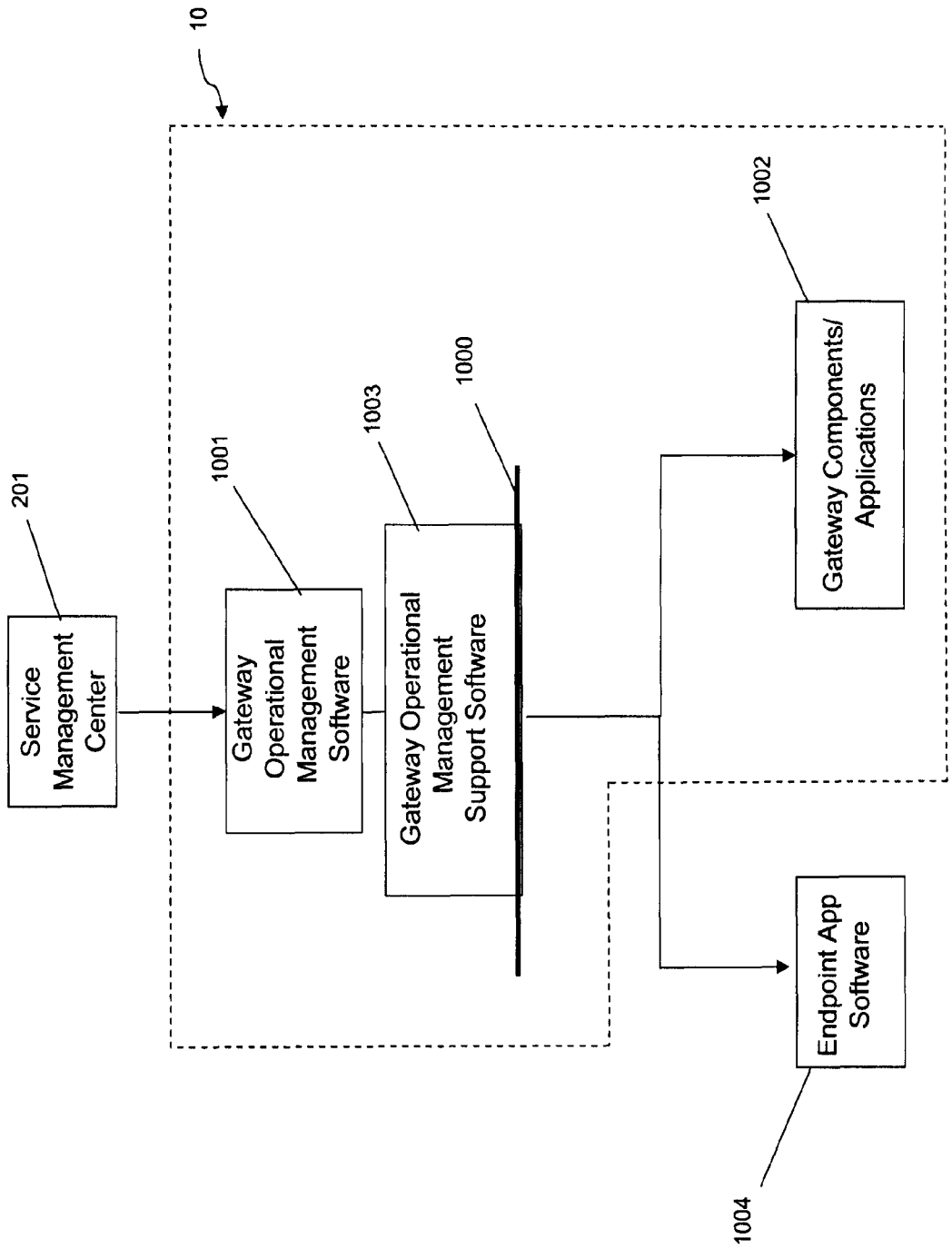
FIG. 5 is a high-level flow diagram of an embodiment of the gateway operational management software extracting operational information from the exemplary gateway device and digital endpoint devices associated with the exemplary gateway device.

FIG. 5 is a high-level flow diagram of an embodiment of the gateway operational management software 1001 extracting operational information from the exemplary gateway device 10 and digital endpoint devices 11 associated with the exemplary gateway device 10. A gateway operation management software 1001 manages operational information on the gateway device 10. The gateway operational management software 1001 is installed on the application service provider managed applications and platform 380 (FIG. 3). Within the layered architecture of the gateway device 10, the gateway operational management software 1001 comprises the billing manager 120a, the fault manager 120b, statistics manager 120f, and the logger manager 110g (FIG. 4B). Supporting the gateway operational management software 1001 are many components within gateway device 10 that are referred to as the gateway operational management support software 1003 as seen in FIG. 5. The modules within gateway device 10 that comprise the gateway operational management support software 1003 include the database management 120c, the configuration management 120d, the control channel interface 120h, the platform manager 110a, the scheduler manager 110b, and the diagnostic manager 110c (FIG. 4B).

Among other things, the gateway operational management software 1001 monitors the state and performance of the gateway device 10, the services delivered to the user's endpoint devices 11 and the state and performance of the endpoint devices 11 attached to the gateway device 10. Based on these functions, the gateway operational management software 1001 generates operational information in the form of billing records, statistical information, alarms, and logs that are stored locally on the gateway device's 10 hard drive 154.

As seen in FIG. 5, the gateway operational management software 1001, through the gateway operational management support software 1003, provides an application software/firmware interface 1000. This interface allows gateway operational management software 1001 to extract operational information from other gateway components and their associated application software 1002 that are running on the gateway device 10. Furthermore, the gateway operational management software 1001, through application software/firmware interface 1000, extracts operational information from endpoint devices and their respective application software 1004.

It should be noted that the application software/firmware interface 1000, as depicted in FIG. 5, is provided for the convenience of an application software programmer. Furthermore, the gateway operational management software 1001 does not require the use of application software/firmware interface 1000 to extract operational information from the gateway device 10 and its associated endpoint devices 11. Therefore, the use of application software/firmware interface 1000 is not to be construed as any limitation, but instead one skilled in the art can imagine other possible ways for gateway operational management software 1001 to extract operational information from gateway device 10 and digital endpoint devices 11 associated with gateway 10.

As referred to above, the gateway operational management software 1001 extracts operational information. The gateway operational management software 1001 stores the operational information locally in databases on the gateway device 10. Specifically, the gateway operational management software 1001 utilizes the database management 120c (FIG. 4B) to store the operational information in the appropriate database. In the exemplary implementation, these databases are realized using, for example, the SQLite open source database. SQLite is a highly efficient database for embedded systems that provides a high-level of transactional protection.

The service management center 201 communicates with the gateway operational management software 1001. The service management center 201 may access the operational information stored on gateway device 10 through control channel 210 by communicating with the gateway device's operational management software 1001. Specific access types by service management center 201, as examples, may include retrieving lost billing records, historical statistics, high priority alarms, and log files.

As previously mentioned, the billing manager 120a (FIG. 4B) is part of the gateway operational management software 1001. Referring to FIG. 5, the components of gateway device 10 and its associated application software 1002 and the endpoint devices 11 and their respective application software 1004 use the billing manager 120a (part of 1001 in FIG. 5) and its associated application software/firmware interface 1000 to generate billing and usage records. In the preferred embodiment, the billing and usage records are expressed in Internet Protocol Detail Record Document (IPDRDoc) format. These records are generated by the service application components which pass the records to the billing manager which handles this operational information as described herein.

Figure 6:
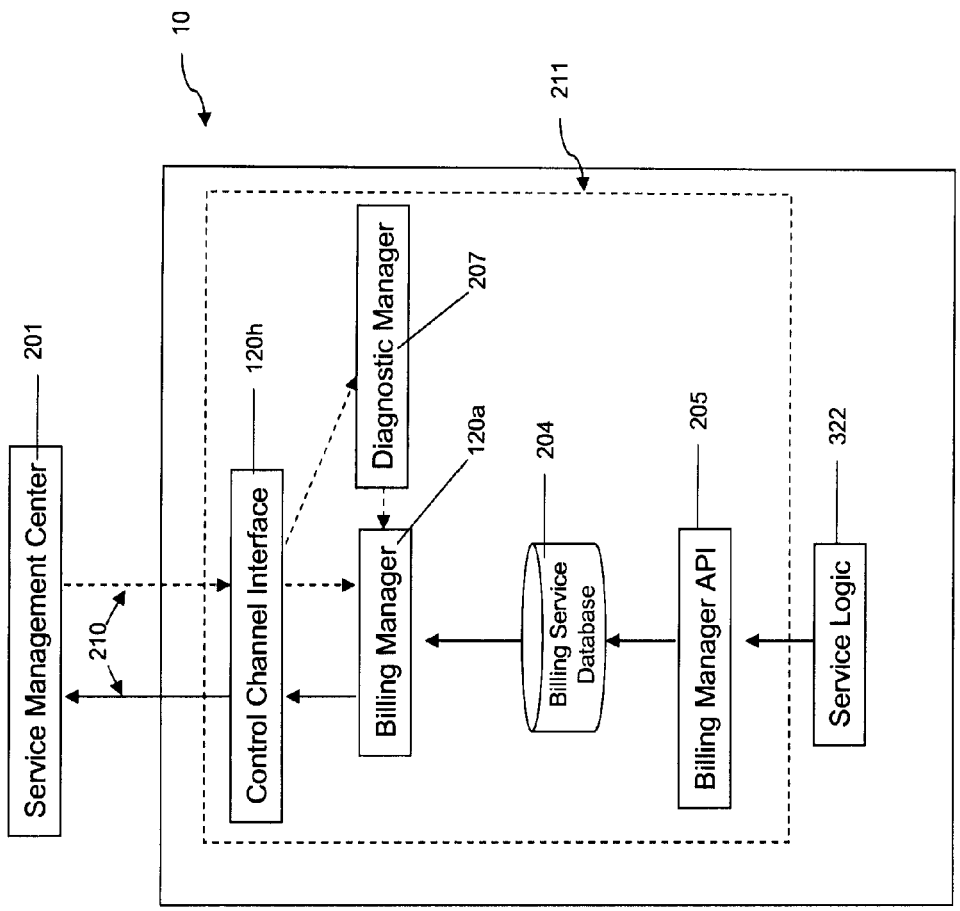
FIG. 6 is a high-level flow diagram of an embodiment of an exemplary gateway device that collects, manages, and stores the billing records associated with the services provided by or through the exemplary gateway device.

FIG. 6 is a high-level flow diagram of an embodiment of an exemplary gateway device 10 that collects, manages, and stores the billing records associated with the services provided by or through the exemplary gateway device 10. In this illustration, the ASL module 322 (FIG. 2) generates billing or usage records based on operational information received from the gateway device 10 or the endpoints 11 associated with gateway device 10. The ASL module 322 provides the billing records to the billing subsystem 211 by calling the billing manager application programming interface (BMAPI) 205. The BMAPI 205 interfaces with the billing service database 204. The billing service database 204 stores the billing records. The billing manager 120a then sends targeted billing records to the service management center 201 at either the end of a billing collection period or when a critical number of records are queued for transmission to the service management center. The determination of when billing records are sent to the service management center 201 is based on the logic within billing manager 120a which is controlled by service management center 201. Further details, concerning service management center's 201 ability to control the logic within billing manager 120a as well as the other modules that comprise the gateway operational management software 1001 (FIG. 5) are described below.

The billing records sent to the service management center 201 are accessed from the billing service database 204 by the billing manager 120a. The records are sent from the gateway device 10 using the control channel 210 connection by accessing the control channel interface 120h. The control channel interface 120h then sends the billing records through control channel 210 across a network connection, such as, for example an IP WAN connection, to the service management center 201. For billing records, the service management center 201 provides a pivotal role that may include providing a SIP-based network border interface and billing services for off-net voice calls.

Because the gateway device 10, in the exemplary system, is an interactive device that enables users to purchase and activate services that are provided by application service provider 98 (FIG. 1), the service management center 201 provides bill collecting capabilities for services rendered at the gateway device 10. Examples of services that may have billing records associated with the application service include, but are not limited to, voice, media such as movies and music, backup services, home automation, file sharing, and parental control.

Figure 10:
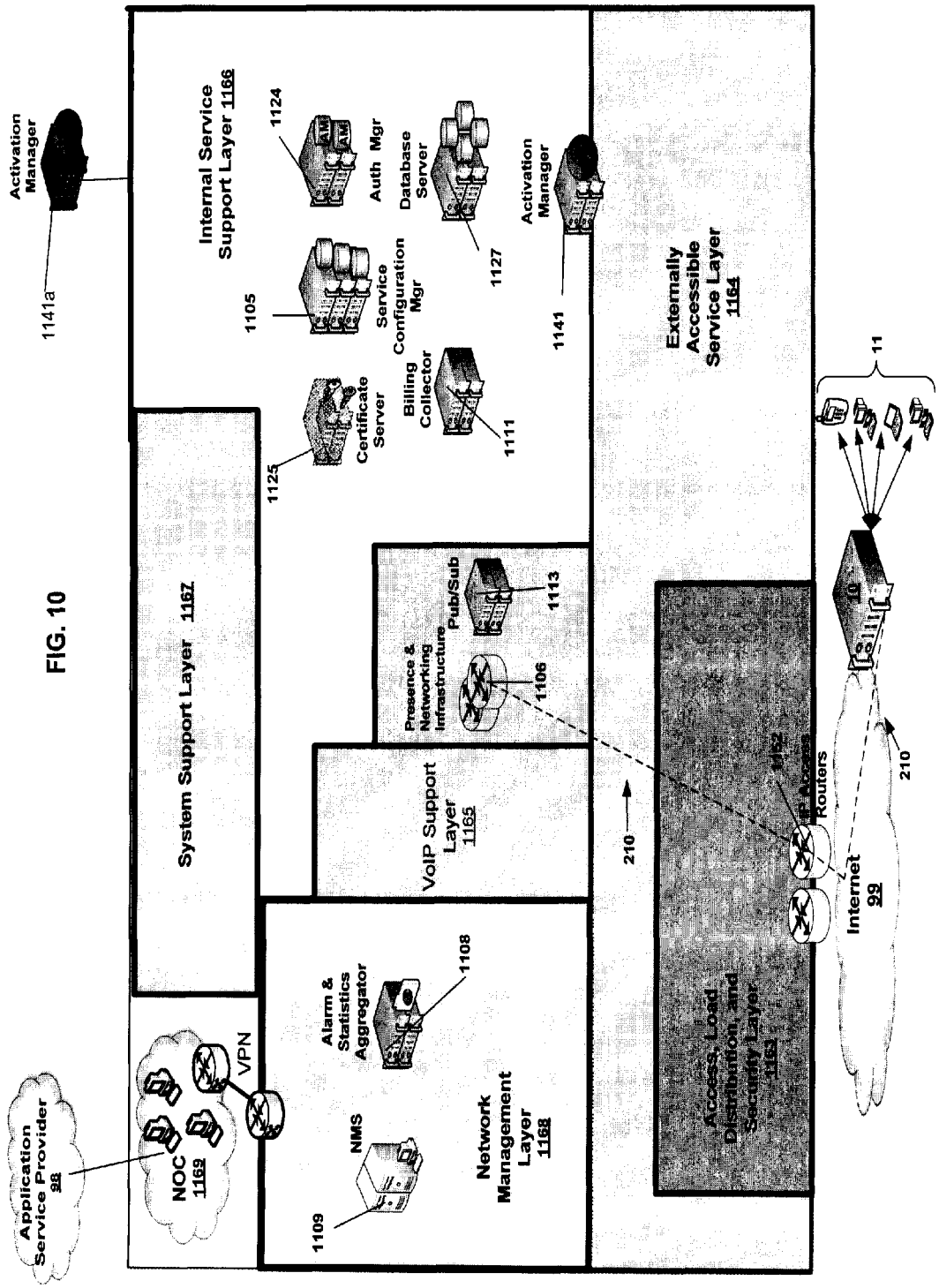
FIG. 10 is an architectural diagram of an embodiment of a service management center.

FIG. 10 is an architectural diagram of an embodiment of a service management center 201. With respect to billing records, the billing collector 1111 communicates with the gateway device 10 to collect and correlate billing records. An example protocol used for communicating billing records between the gateway device 10 and the billing collector 1111 is XMPP, although not limited to such. XMPP is defined in IETF RFCs 3920 and 3921. For example, the process of transferring the records generated by the gateway device 10 may be through the XMPP protocol and the application layer protocol attributes. Example attributes of the XMPP protocol may include, the gateway device 10 initiating a "message" stanza, the "to" attribute containing the full JID of the billing collector or like functionality, a stream unique "id" assigned to the message, and the body of the message containing the gateway device 10 generated event record in a string format. An example application layer protocol may contain data such as a unique message ID which may be different from the message of the XMPP layer, message sequence number (e.g., 1, 2, 3, etc.), and total number of bytes in the event record contained in the body of the XMPP "message." It should be noted that the XMPP is also contemplated as a protocol to use with respect to the transmission of other operational information such alarms, statistics, and logs from gateway device 10 to service management center 201 which will be discussed in more details below.

In one embodiment, the gateway device 10 and other endpoint devices 11 generate records of billable events, which may be used for billing, verifications, troubleshooting and other purposes. The gateway device 10, for example, may record all billable events and send the data to the billing collector 1111. This transmission of billing data may occur at a regular interval or a predefined interval or at other desired time or period.

Referring to FIG. 10, one or more gateway devices 10 may communicate billing records via XMPP messages that include billable events to the billing collector 1111 via control channel 210 across a WAN such as IP network 99 to a presence and networking infrastructure 1106. In one embodiment, the process of transferring a billing record from a gateway device 10 to the billing collector 1111 may be a two-way handshake. When the billing collector 1111 receives the billing record from the gateway device 10, the billing collector 1111 checks the billing record for errors. If there are no errors, the billing collector 1111 writes the data to a file and stores it, e.g., on a storage device. If an error occurred in the message then the billing collector 1111 may formulate an error message and send it to the gateway device 10. The message may contain a reason for the error.

Next, the billing collector 1111 sends an acknowledgment to the gateway device 10 for the billing record received. The acknowledgment message, for example, may contain the same message id as the original billing record, so that the gateway device 10 can identify that it is in receipt of the billing record sent. If the acknowledge states there were no errors in the billing record then the process of transmitting that particular billing record ends. On the other hand, if the acknowledgment states the billing record contained an error, then the gateway device 10 would retransmit the billing record to the billing collector 1111. In one embodiment, if the gateway device 10 does not receive the acknowledgment message within a predetermined wait-time, it may resend the message to the billing collector 1111.

Example functionalities on which a gateway device 10 may generate billing records are listed in Table 1.

TABLE 1

| Name of Event | Condition |
| --- | --- |
| Voice Call | Generates Billing Record for Call Answer Event and for Call Termination |
| Backed up File Restored | Generates Billing Record specifying the file name recovered, the file size, and the time of the recovery |

As previously mentioned, the statistics manager 120f is part of the gateway operational management software 1001. The statistics manager 120f provides for two types of statistics: real-time and periodic. Real-time statistics reflect the current state of the component relative to the component start time while a periodic statistic reflects the value of the statistic for a period of time. For example, consider the simple counter statistic control_message_received belonging to the control channel component. The real time form of this statistic increases from zero (0) monotonically until it reaches its maximum value and then rolls over to zero (0) again. The periodic form of this statistic for a recently expired period of 15 minutes is set to the number of packets received during that 15 minute interval. Finally, the Statistics Manager provides gauge statistics which indicate the amount of some resource. For example, the CPU utilization of the gateway device 10 is a gauge statistic. The periodic form of a gauge statistics has min, max and average values over the period. The real-time form of a gauge statistic has the value at the time of the real-time statistic query.

Figure 7:
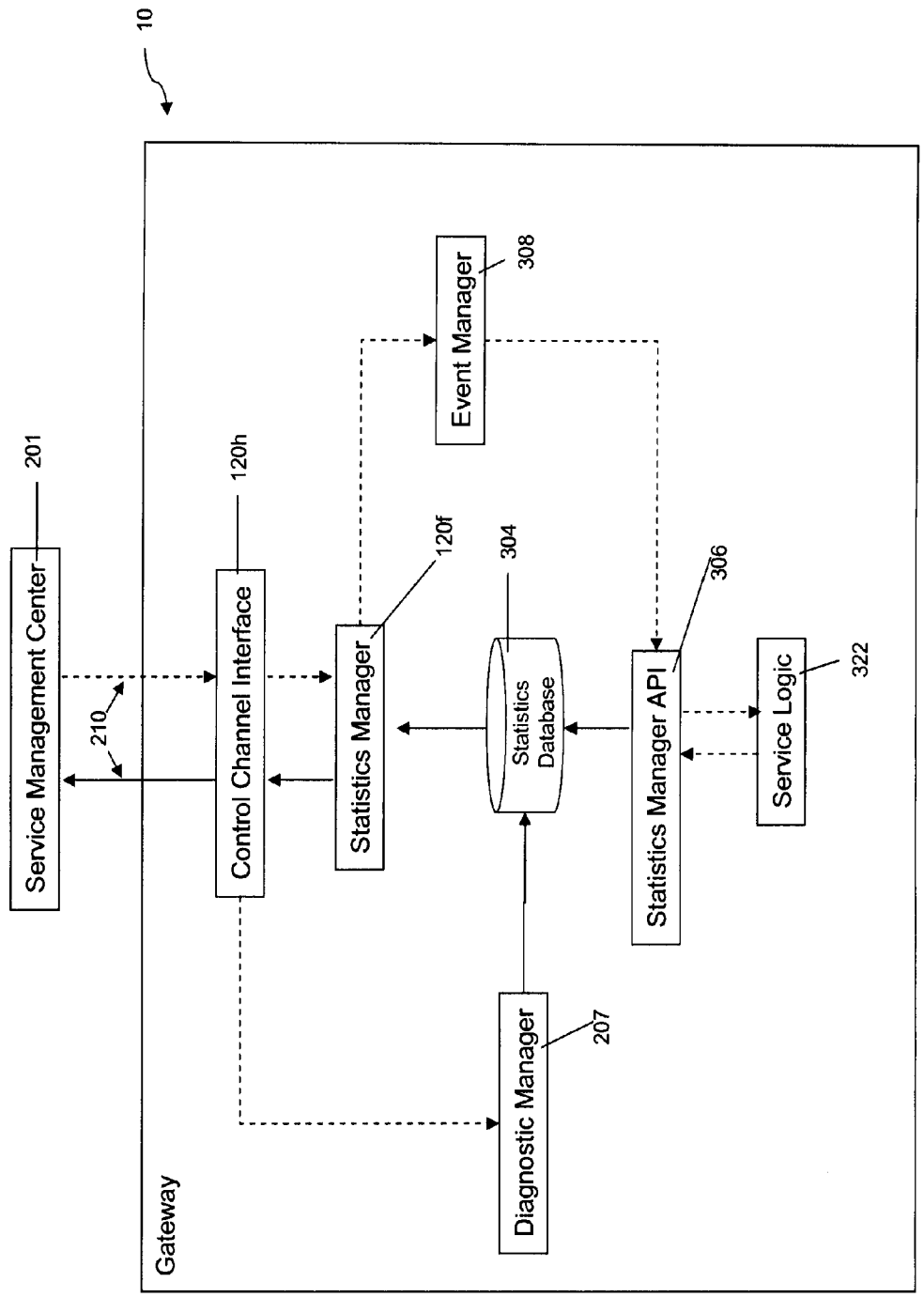
FIG. 7 is a high-level flow diagram of an embodiment of an exemplary gateway device that collects, manages, and stores the statistical data associated with the services provided by or through the exemplary gateway device.

FIG. 7 is a high-level flow diagram of an embodiment of an exemplary gateway device 10 that collects, manages, and stores the statistical data associated with the services provided by or through the exemplary gateway device 10. The gateway device 10 and the service management center 201 use the statistics manager 120f to implement statistics. As illustrated in FIG. 7, statistics are generated by the interaction between the ASL module 322 (FIG. 2) and the statistics manager application programming interface 306. More specifically, the statistics manager 120f provides logic to the event manager 308 that in turn sends gathering timer events to the statistics manager application programming interface 306. Upon receipt of these gathering events, the statistics manager application programming interface 306 gathers the statistic values from the ASL module 322, resets the periodic statistics, and stores those statistics in the statistics database 304. The determination of when statistical information is sent to the service management center 201 over the control channel 210 through control channel interface 120h is based on the logic within statistics manager 120f, which is controlled by service management center 201. Further details concerning service management center's ability to control the logic within statistics manager 120f as well as the other modules that comprise the gateway operational management software 1001 will be discussed below.

Example functionalities based on which a gateway device 10 may generate statistics are defined in Table 2.

TABLE 2

| Sample of System functionality | Example Statistic Description |
| --- | --- |
| Monitor the CPU utilization on a continuous basis | Current CPU Utilization in percent utilization |
| Memory | Amount of Memory Utilized (MB) |
| Monitor the disk utilization on a regular basis | Disk Utilization in percent utilization |
| Keep track of login attempts | Number of Login Attempts |
| Track firewall probe attempts | Number of Firewall Probe Attempts |

Figure 8:
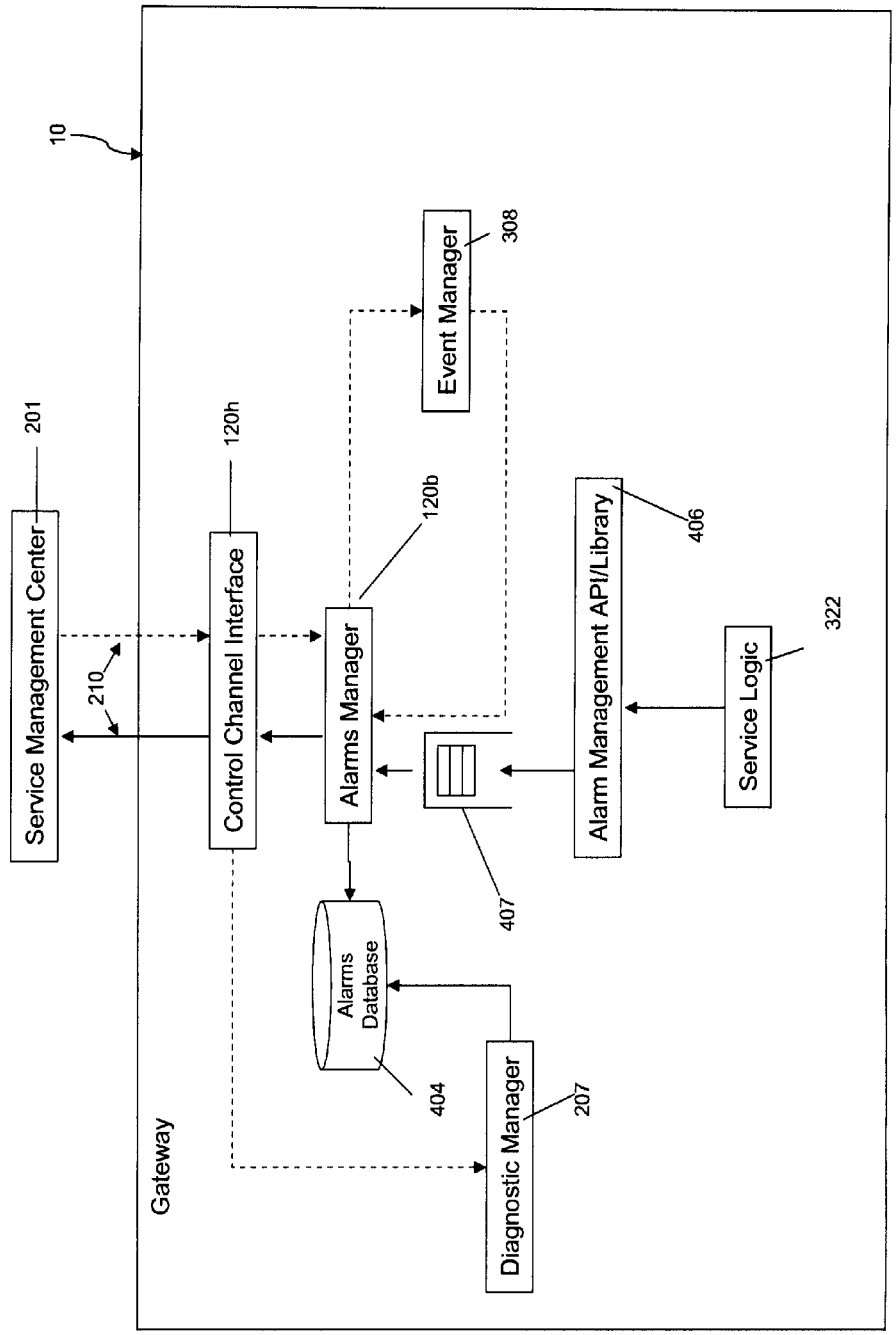
FIG. 8 is a high-level flow diagram of an exemplary gateway device that collects, manages, and stores the alarms associated with the services provided by or through the exemplary gateway device.

As described above, the fault manager 120f is part of the gateway operational management software 1001 (FIG. 5). The fault manager 120f, also known as the alarm manager, manages the alarm information generated by the gateway device 10 and its associated endpoint devices 11. FIG. 8 is a high-level flow diagram of an exemplary gateway device 10 that collects, manages, and stores the alarms associated with the services provided by or through the exemplary gateway device 10. As illustrated in FIG. 8, the ASL module 322 generates alarms sending these alarms to the alarm manager 120f via the alarm manager application programming interface 406 and incoming queue 407. The alarm manager 120f filters these alarms following the logic downloaded from the service management center 201 through the control channel 210 via the control channel interface 120h. After filtering the alarms, the alarm manager 120f saves these alarms in the alarm database 304. The event manager 308 notifies the alarm manager 120f that that control channel 210 is established and thereby the alarm manager can send alarms to service management center 201. The alarm manager 120f maintains timers for timeouts such as: dispatch, purge and expiry. On the dispatch event, the alarm manager 120f sends the alarms scheduled to be delivered to the service management center 201. On the purge event, the alarm manager 120f removes dated alarm records from the alarm database 404. On the expiry event, the alarm manager 120f finds and deletes alarms in its incoming queue 407 which are older than the expiration time.

The gateway device 10 may have the ability to generate alarms intended for the ultimate consumption of the user when a pre-configured threshold value is exceeded. A user may have an option to set the method by which the user may be notified when an alarm is generated. In one embodiment, multiple notification events are defined on the gateway device 10. These notification events may be capable of being associated with different roles so that assigned user can be notified when the event occurs. Examples of different methods of notification may include but not limited to e-mail, a text or SMS message, instant messaging, personal page, TV, and telephone. Every role (types of users) may have the ability to receive notification for any notification event. In one embodiment, the same notification or alarm event may be notified in multiple ways to the same user. Analogously, the same notification or alarm event may be notified in multiple ways to different users.

Example functionalities based on which a gateway device 10 may generate alarms are defined in Table 3.

TABLE 3

| Name of alarm (examples) | Condition for alarms to be generated |
| --- | --- |
| TEMP_ALARM | If the temperature thresholds on the devices that are temperature controlled are exceeded |
| DISKUTIL_ALARM | the disk utilization exceeds critical levels |
| SYSDOWN_ALARM | when applications or subsystems are down or service faults are detected |
| FIRMUPFAIL_ALARM | failed firmware upgrade |
| LOGIN_ALARM | If the number of login attempts exceeds the configured maximum value within a preconfigured duration |

Figure 9:
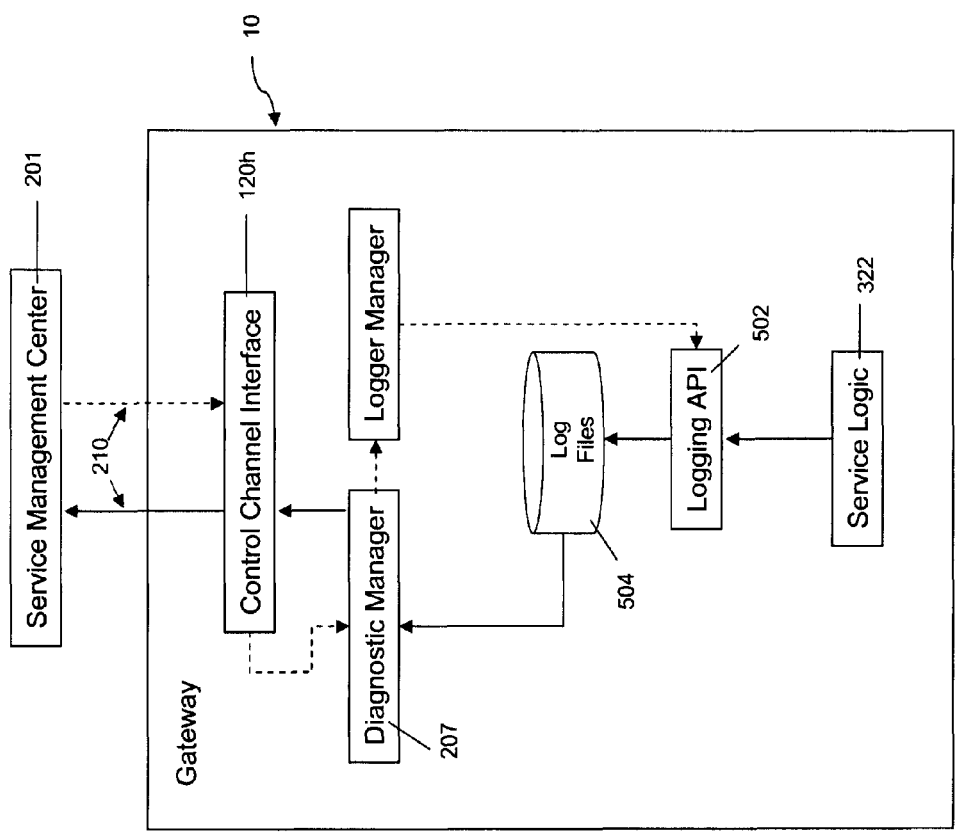
FIG. 9 is a high-level flow diagram of an exemplary gateway device that collects, manages, and stores the logs associated with the services provided by or through the exemplary gateway device.

As described above, the logger manager 110g is part of the gateway operational management software 1001. FIG. 9 is a high-level flow diagram of an exemplary gateway device 10 that collects, manages, and stores the logs associated with the services provided by or through the exemplary gateway device 10. Referring to FIG. 9, the logger manager 110g manages log information generated by the interaction between the ASL module 322 and the logging application programming interface 502. In the preferred embodiment, the logging application programming interface 502 is associated with either log4cplus or, in the case of a third party software component, the LINUX syslog system to create logs. The logger manager 110g controls the maximum size of the log files and rolls over the files by interacting with the logging application programming interface 502. The log files created by the interaction between the ASL module 322 and the logging application programming interface 502 are stored in the log files 504. The service management center 201 can control the logger manager 110g by accessing the control channel interface 120h through the control channel 210 established between gateway device 10 and service management center 201.

Example functionalities based on which a gateway device 10 may generate logs are defined in Table 4.

TABLE 4

| Sample of System functionality | Condition for logs to be generated |
| --- | --- |
| monitor the CPU utilization on a continuous basis | if the CPU utilization exceeds preconfigured threshold values the system may create a log |
| monitor the disk utilization on a regular basis | if the disk utilization exceeds preconfigured threshold values the system may create a log to capture:<br>1. preconfigured threshold value<br>2. current utilization level |
| Keep track of login attempts | if unsuccessful login attempts are noticed the log shall capture:<br>1. date and time of the login attempt<br>2. the userid of the login attempt<br>3. number of attempts made |
| Track firewall probe attempts | Provide firewall process logs<br>If the number of attempts exceeded the maximum allowed value within a preconfigured duration, the events may be logged. |

FIG. 10 illustrates an architectural overview of the service management center 201. The service management center 201 controls the behavior of the gateway operational management software via the control channel 210. The service management center 201 instructs the gateway device 10 on specific operational information to transmit immediately, how to purge historic information, disk space limits for operational information, logic to generate operational information, and retrieval of specific operational information. This control and access allows the service management center 201 to monitor the performance and state of the network's service delivery function as well as managing the performance of the gateway devices 10 and endpoint devices 11 used in service delivery.

As described briefly above, the service management center 201 can instruct the gateway operational management software 1001 as to what information the gateway device 10 should send and when that information should be sent to the service management center 201. Specifically, the service management center 201 downloads logic into the various components of the gateway operational management software 1001 to gather information for the gateway device 10. As an example, service management center 201 would access billing manager 120a (FIG. 6) through control channel 210 to change the logic dictating the gateway's parameters for handling billing records. This same method can be used by the service management center 201 to change the logic in the gateway operational management software 1001 with respect to statistics manager 120f (FIG. 7), alarms manager 120b (FIG. 8), and logger manager 110g (FIG. 9).

Figure 11:
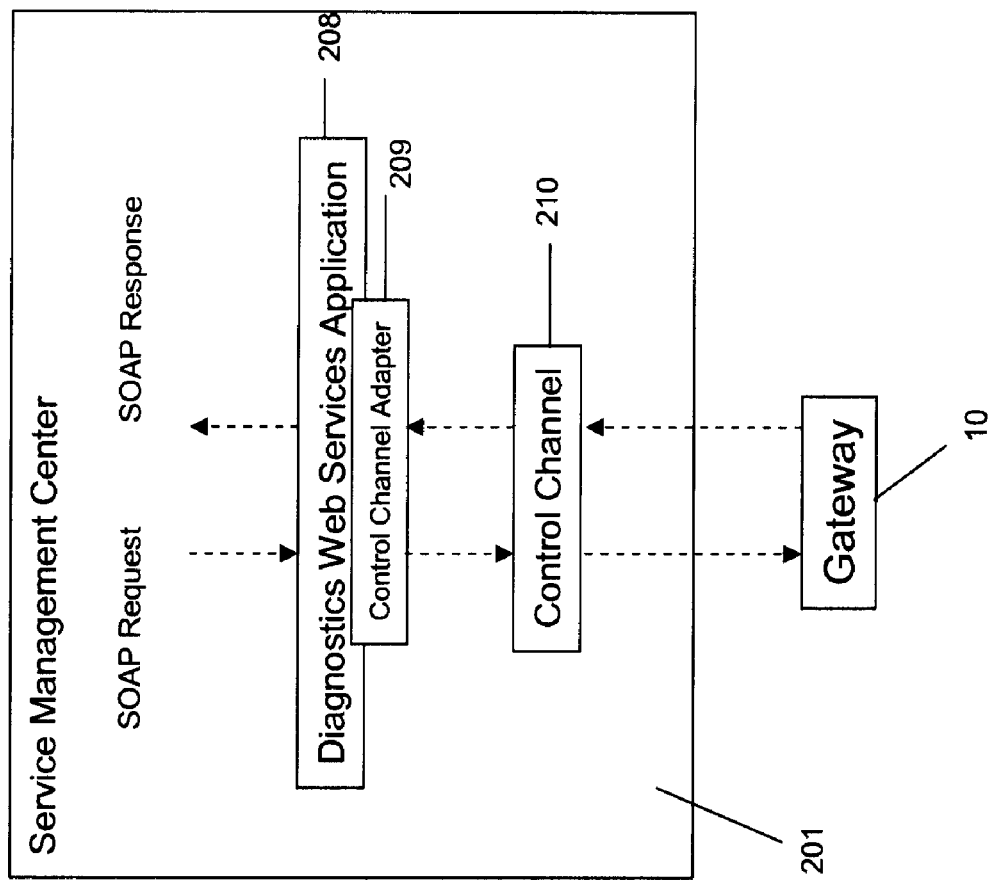
FIG. 11 is a high-level flow diagram of an embodiment of a service management center using a diagnostic manager on an exemplary gateway device to access the operational information stored on the gateway device for data mining and debugging purposes.

As an alternative method, FIG. 11 demonstrates an example of how service management center 201 can use diagnostic manager 207 to access the operational information stored on the gateway device 10 for data mining and debugging purposes. FIG. 11 is a high-level flow diagram of an embodiment of service management center 201 using diagnostic manager 207 on an exemplary gateway device 10 to access the operational information stored on the gateway device 10 for data mining and debugging purposes. For example, when a billing record is lost, as detected by a gap in the billing record sequence numbers, the service management center 201 generates a SOAP request for the missing billing record to the diagnostic web services application 208 which converts this to a XMPP control message and sends this using its control channel adapter application programming interface 209. This message is then sent to the gateway device 10 through the control channel 210. Referring to FIG. 6, the gateway device 10 receives an XMPP message requesting the lost billing record by sequence number via the diagnostic manager 207. Upon receipt from an indication from the diagnostic manager, the billing manager 120a sends the requested record to the service management center 201.

Only a small portion of the operational information generated and stored locally is sent to the service management center 201. However, all the operational information is stored locally in respective databases such as billing service database 204 (FIG. 6), statistics database 304 (FIG. 7), alarms database 404 (FIG. 8), and log files 504 (FIG. 9). The service management center 201 can request that this historical information be sent by the gateway device 10 to the service management center 201 through a diagnostic manager 207. As seen in FIGS. 7-10 with respect to the collection of operational information concerning billing, statistics, alarms, and logs, each of those collection efforts use the diagnostic manager 207 that allows the service management center 201 to access historical operational information stored on gateway device 10.

Additionally, the service management center 201 may use diagnostic manager 207 to access the gateway's historical operational information whenever a customer calls in with a problem. The service management center can use its access to the operational information stored on the gateway device 10 for data mining and debugging purpose. One skilled in the art can recognize that this remote access to historical and current data could be used to perform any number of sample studies that would be useful in optimizing network operations as well as marketing activities.

Additionally, FIG. 10 illustrates an architectural overview of the service management center 201 and demonstrates how the alarms and statistics aggregator 1108 collects the alarms, statistics, and log information from gateway device 10. The service management center 201 processes alarms, statistics, and logs through the alarms and statistics aggregator 1108. For example, alarm aggregator 1108 may collect operational information from the gateway device 10 using the control channel 210. Furthermore, alarms and statistics aggregator 1108, for example, may request operational information from selected gateway device 10 at predetermined intervals. Operational information may also be collected on demand, for instance, when a user requests diagnostic information for a selected gateway device 10. Further yet, the gateway devices 10 may communicate alarms to the alarms and statistics aggregator 1108 as they occur.

In an exemplary embodiment, referring to FIG. 10, the alarms and statistics aggregator 1108 enables monitoring and troubleshooting the gateway device 10. The alarms and statistics aggregator 1108 in general may provide a collection point for all alarms, statistical information, and logs from the gateway device 10. These alarms, statistics, and logs are massaged, e.g., filtered or reformatted, and forwarded to the network management system 1109 for monitoring and managing of the gateway device 10. In the preferred embodiment, the network management system 1109 monitors the aggregated performance of gateway devices 10 by aggregating the summary statistics (see discussion in reference to FIG. 12) and performing filtering of more detailed alarms and statistics from a sample of the gateway device 10 population. In one possible embodiment, the aggregator functionality 1108 may serve as a conduit for querying information from each gateway device 10 and information requests may be performed through simple networking management protocol (SNMP) Gets initiated by the network management system 1109.

Specific to FIG. 10, alarms, statistics, and log information are sent from the gateway device 10 through a control channel 210 via a WAN, such as IP network 99 to service management center 201. The presence and networking infrastructure 1106 maintains the control channel 210 between the gateway device 10 and the service management center 201. Upon receipt of alarms, statistics, and log information, the presence and networking infrastructure 1106 transmits this operational information to the alarms and statistics aggregator 1108. Finally, the alarms and statistics aggregator 1108 transmits the information to the network management system 1109 for monitoring and managing of the gateway device 10. In the preferred embodiment, the aggregator(s) 1108 receive alarms and statistics in the format of XMPP messages, but other protocols are contemplated.

In one embodiment, a mechanism for load balancing and redundancy may be provided for the alarms and statistics aggregators 1108. One mechanism may include performing load balancing across the aggregators 1108 through a separate application or functionality referred to as alarm component (not shown in FIG. 10). Alarm components may manage connectivity between the presence and networking infrastructure 1106 and the alarms and statistics aggregators 1108, as well as evenly distribute incoming messages across all aggregators 1108. The alarms and statistics aggregators and components may run in N+1 configuration, which may permit an aggregator or component to be unavailable without affecting the collection of alarms, statistics, and log information.

In another embodiment, connectivity to the presence and networking infrastructure 1106 may be integrated directly into the alarms and statistics aggregators 1108. In this embodiment, the routing of messages from the gateway device 10 to the alarms and statistics aggregators 1108 may be based on each gateway device 10 establishing a static connection to the presence and networking infrastructure 1106. Furthermore, each alarms and statistics aggregator 1108 may establish static connections to multiple points within the presence and networking infrastructure 1106, for instance, with no point within the presence and networking infrastructure 1106 having more than one aggregator connection. In this embodiment, messages from a gateway device 10 may then flow through a common path to the same the alarms and statistics aggregators 1108. If an aggregator is unavailable, then messages for that alarms and statistics aggregator 1108 may route to the closest available aggregator via an alternative path through the presence and networking infrastructure 1106.

Based on the aggregated operational information received by service management center 201 across all gateway devices 10 the service management center 201 can use this aggregated operational information to optimize the service delivery to each gateway device 10. The service management center 201 controls the gateway devices 10 at two points: the diagnostics interface as described above and through subscriber provisioning. Typically for a large number of gateway devices 10 the service management center 201 would use subscriber provisioning to control the gateway operational management software 1001 which controls the operational information. When the gateway device 10 is first activated on the exemplary network, shown in FIG. 1, the gateway device 10 requests from service management center 201 its provisioning. This provisioning includes instructions to the gateway operational management software 1001 on what, when, where, and how to collect and transmit operational information to service management center 201. It should be noted that the gateway's operational management software 1001 may be updated any time after the gateway device 10 is activated by the service management center 201 notifying the gateway device 10 of a new provision version.

An example of subscriber provisioning is described with reference to FIG. 10. Assume the application service provider 98, through a new provisioning version of their software, establishes that a certain statistic should be gathered every 15 minutes and transmitted to the service management center 201 every 2 hours. In order to accomplish this, the application service provider 98 would communicate with the service management center 201 by adjusting the subscriber provisioning in the service configuration manager 1105 accordingly. When the change is made in the subscriber provisioning, the pub-sub system 1113 notifies affected gateway devices 10. The gateway devices 10 request the new provisioning from the service management center 201 and update the appropriate module in the logic comprising the gateway operational management software 1001. In this case, the statistics manager **120*f* would be updated and thereby start gathering the updated statistic every 15 minutes storing the results in the statistics database 304. Every 2 hours, the statistics manager 120*f* would transmit the updated statistic to the service management center 201 across control channel 210**.

This statistic from all gateway devices 10 would be aggregated by the alarms and statistics aggregators 1108. Using the operational information collected by the alarms and statistics aggregators 1108, the service management center 201 can control billing, statistics, alarm, and logs information generation and transmission and thereby one skilled in the art can recognize the potential to optimize the network and application service delivery to gateway device 10 and its associated endpoint devices 11.

It should be noted that subscriber provisioning may include assigning subscribers to predefined gateway classes. A class of gateway devices 10 may be defined by, for example, geographic regions, service basis, and/or model number of gateway device 10. By grouping gateway devices 10 into classes, the service management center can adjust or filter, for example, operational information for a particular class.

The gateway device 10 can generate a large amount of operational information and transmit this information over the control channel 210. While the service management center 201 controls this information by enabling and disabling transmission of this information by the gateway device 10, in this novel system, the service management center 201 is not directly involved in service delivery and a summary statistic, as seen in FIG. 12, is invented so that the service management center 201 can become apprised of the success of service delivery across the exemplary network seen in FIG. 1. FIG. 12 is a table illustrating summary statistics that a gateway device 10 may send to service management center 201 to provide the status of the gateway device 10. These summary statistics are designed to indicate the status of the gateway device's 10 services without requiring a large amount of operational information to be transmitted to the service management center 201. As discussed above, the service management center 201 can aggregate operational information which includes the summary statistics across the entire user base of gateway devices 10 to understand the performance of each of the services provided by the application service provider 98 to the gateway device 10 and their respective endpoint devices 11. The summary statistic is a single digit number that indicates if the user used the service during the statistics collection interval and the percentage success that the user had with that service. These statistics give the service management center 201 an extremely accurate appraisal of the success of service delivery to the gateway devices 10 and endpoint devices 11. By default, all gateway devices 10 deliver summary statistics to the service management center 201.

An example of several summary statistics is shown in FIG. 12. Looking at the voice summary statistic row 250, the gateway would set this statistic to zero (0) if no voice calls were made during the gathering period. If during this gathering period at least one voice call was attempted and all voice calls were successful, the gateway would set this statistic to 3 indicating 100% success.

It is uneconomical to deploy control channel 210 bandwidth and processing power in the service management center 201 to process every piece of operational information generated by all the gateway devices 10 and their associated endpoint devices 11. As previously mentioned, the communication between the gateway device 10 and the service management center 201 is carried within XML stanzas over an XMPP control channel 210. To help conserve network resources, the gateway operational management software 1001 compresses the information carried over the control channel 210 while maintaining the UCS/Unicode Transformation Format required by XMPP and XML. This compression is accomplished by using positional comma separated values, by performing universal compression techniques limited to an ASCII output space, or by compressing the information and then Uuencode the compressed information. In the exemplary gateway operational management software 1001, compression is achieved by using positional comma separate values.

With further respect to FIG. 10, the architecture of service management center 201 is composed of various layers that provide the security and service architecture required to support the various gateway devices 10. This layered architecture is a way to group the functional components into logical related grouping. The layered architecture as seen in FIG. 10 is made up of the following layers: access, load distribution, and security layer (ALDS) 1163, externally accessible service (EAS) layer 1164, VoIP support layer 1165, internal services support (ISS) layer 1166, system support (SS) layer 1167, and network management (NM) layer 1168.

The equipment in the ALDS layer 1163 provides the public interfaces addressable from the public Internet through the IP access routers 1152 connecting the service management center 201 to gateway device 10 across IP network 99. This layer contains all devices that will be the initial entry point of all traffic entering the service management center 201. The ALDS layer 1163 provides security, access control, and load balancing of traffic directed to the service management center 201. Furthermore, the ALDS layer 1163 may use network address translation to provide virtual public IP addresses that map to servers located in the externally accessible service interface layer 1164.

The components of the ALDS layer 1163 provide safe access into the service management center 201 by, 1) only mapping well-known connection ports to listening servers, 2) providing port based network address translation (PAT) from the public access network to the private service management center 201 network, 3) protecting the internal application servers from attacks on accidentally open ports, and 4) screening for protocol bugs that allow illegal access into applications.

The EAS layer 1164 contains servers that can be accessed by devices external to service management center 201 such as gateway device 10. Specifically, the servers comprising the EAS layer 1164 may include, for example, the activation manager 1141. The activation manager 1141 receives and processes a new gateway device's 10 activation request coordinating with the authentication manager 1124 and the certificate server 1125 to authenticate and provide keys and certificates for the activated gateway.

The EAS layer 1164 contains the initial entry point for access into the ISS layer 1166 to provide services to the gateway device 10. For example, the servers within the EAS layer 1164 may provide access for Internet based services, like email and remote user access. Additionally, the servers in the EAS layer 1164 may be grouped into server farms and load balanced using the server load balancer 1149 in the ALDS layer 1163.

The VoIP support layer 1165 may comprise of servers supporting voice services within the exemplary architecture. For example, the VoIP support layer 1165 may process session initiation protocol (SIP) voice calls by performing end user authorization using the authentication manager 1124 and redirect the SIP call to the users location (i.e. IP address). The equipment in the VoIP Support layer 1165 is protected from access from the Internet via the session border controller 1151 located in the ALDS layer 1163.

The ISS layer 1166 provides the functional support for the application services available to the gateway device 10. All service requests from the gateway device 10 enters though the EAS layer 1164 prior to being processed by the functions residing in the ISS layer 1166. The equipment in the ISS layer 1166 may include, but not limited to, service configuration manager 1105, authentication manager 1124, certificate server 1125, database server 1126, and billing collector 1111. The service configuration manager 1105 maintains the subscribers' service information used to configure the gateway device 10 and its associate endpoint devices 11. The authentication manager 1124 receives requests to authenticate the gateway device 10 and the services the subscribers use. The certificate server 1125 creates signing certificates for the gateway device 10 and its associated endpoint devices 11. The database server 1127, for example, is the database for the service configuration manager 1105, the authentication manager 1124, the presence and networking infrastructure 1106, and the activation manager 1141. The billing collector 1111 collects billing records.

The SS layer 1167 provides the services that are used internally within the service management center 201. For example, the SS layer 1167 may provide a timing server to synchronize the internal architecture within the service management center 201. The internal services provided by the SS layer 1167 can be used by all other internal layers of service management center 201, but are not accessible by the gateway device 10.

The equipment comprising the NM layer 1168 may include, but not limited to, the network management system 1109 and alarms and statistics aggregator 1108. The network management system 1109 is a collection of computer equipment that receives and manages alarms and statistics for the service management center 201 and the gateway device 10 and its associated endpoint devices 11. The alarms and statistics aggregator 1108 processes the statistic and alarm feeds from all gateway devices 10 and all other servers and sends them to the network management system 1109.

The NM layer 1168 provides the support for access to and management of operational information from other components of the service management center as well as gateway device 10 and its associated endpoint devices 11. In addition, the NM layer 1168 may contain the access point for the network operations center 1169 and subsequently application service provider 98 into the infrastructure of the service management center 201.

Additional components of the service management center 201 include the network operations center 1169, the presence and networking infrastructure 1106, publisher/subscriber server 1113, and IP access routers 1152. The network operations center 1169 is a location containing computers used by network support personnel for managing the service management center 201. The presence and networking infrastructure 1106 maintains the control channel 210 to the connected gateway device 10 to route command and control messages between the gateway device 10 and the support servers within the service management center 201. The publisher/subscriber server 1113 allows the servers in the service management center 201 to subscribe gateway devices 10 and its associated endpoint devices 11 to topics and send notifications to gateway devices 10 and its associated endpoint devices 11 which have subscribed to a topic. The IP access routers 1152 are the routers that terminate the physical interfaces to the IP network 99 and route IP packets to and from the service management center 201.

The gateway device 10 and its interactions with various endpoint devices 11, service management center 201, and application service provider 98 have been described with reference to diagrams of methods, apparatus (systems) and computer program products above. It will be understood that elements and functions illustrated in the diagrams, can be implemented by computer program instructions running on one or more appropriately configured hardware platforms, e.g. to operate as a gateway device 10 or as one or more systems implementing functions of the service management center 201. Hence, operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

Program aspects of the technology may be thought of as "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device 10 or associated modules thereof or any of the hardware platforms as may be used in the service management center 201, such as various semiconductor memories, tape drives, disk drives and other devices now known or to be developed, which may provide storage at any time for the software software/firmware. All or portions of the software may at times be communicated through the Internet or various other telecommunication networks. Such communications, for example, may enable loading of the software from one computer into another computer, for example, from gateway device 10 or from another source into an element of the service management center 201. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

Those skilled in the art will recognize that the teachings of this disclosure may be modified, extended and/or applied in a variety of ways. An extension of the system architecture, for example, provides the ability of various and disparate third-party application service providers 98 to provide multiple application services independently. Application services are managed by the application service provider 98 through the service management center 201, meaning, generally, authorizing, provisioning, and monitoring the usage of a particular application service. This can be accomplished in a variety of ways with varying degrees of involvement of, or coordination with, the service management center 201. The service management center 201 could manage these items "soup-to-nuts" or have minimal involvement. For example, the service management center 201 could deal directly with the third-party application service provider 98 to acquire application services at the request of a user and manage the delivery, authorization, usage-monitoring and upgrading of the application service. At the other end of the spectrum, a service provider may have arrangements with the third-party application service provider 98 by which orders or requests from the users may come directly to the third-party application service provider 98, and services are delivered to the user by the third-party service provider who in turn coordinates with the managed service provider to register and monitor the particular application service placed in the gateway device 10. It should be noted that this ability to manage application services extends through the gateway device 10 into the endpoint devices 11 registered or associated with the gateway device 10 or service management center 201.

While embodiments of the invention have been illustrated and described in detail in the disclosure, the disclosure is to be considered as illustrative and not restrictive in character. All changes and modifications that come within the spirit of the invention are to be considered within the scope of the disclosure.

The foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A gateway device for operation at a user premises having at least one endpoint device associated with the gateway device, the gateway device being in communication with a remote service manager, the gateway device comprising:
   an application service module having at least one application, the application service module being remotely managed by a remote service manager via a connection, the application service module residing on a user premises side of a network service provider demarcation;
   a user module having a user interface that is associated with the at least one application, wherein the user module enables bi-directional communications with the at least one endpoint device;
   a network module having the connection that enables bi-directional communications with the remote service manager;
   a processor coupled to the user module, application service module, and network module; and
   a storage device coupled to the processor operable to store operational information generated by and related to the gateway device, and having a management module operable to process the operational information and provide summary information based on the processed operational information on a per application basis to the remote service manager.

2. The gateway device of claim 1, wherein the connection that enables bi-directional communications with the remote service manager comprising a network layer connection.

3. The gateway device of claim 1, wherein the remote service manager comprises a service management center external to the user premises.

4. The gateway device of claim 1, wherein the remote service manager comprises an application service provider external to the user premises.

5. The gateway device of claim 1, wherein the operational information is selected from the group consisting of billing information, alarm information, statistical information, summary statistics, and log information associated with the gateway device, the at least one application, and the at least one endpoint device.

6. The gateway device of claim 1, wherein the summary information comprises a two-bit data representing a degree of service delivery success.

7. The gateway device of claim 6, wherein the remote service manager is operable to collect the two-bit data from a plurality of gateway devices and generate summary statistics in response to the collected two-bit data therefrom.

8. The gateway device of claim 1, wherein the remote service manager is operable to direct the control of the operational information.

9. The gateway device of claim 1, wherein the remote service manager is operable to direct the control of the operational information of at least one of the following: across all users, on a per-user basis, and by a class of users based on a subscription to an application service.

10. The gateway device of claim 1, wherein the management module, under the control of the remote service manager, is operable to perform at least one of retrieval, aggregation, compression and filtering of the operational information.

11. The gateway device of claim 1, wherein the management module is operable, under the control of the remote service manager, to determine the availability, status, integrity, quality and performance of at least one of: the at least one application, connectivity to a network, and at least one service offered via the remote service manager.

12. The gateway device of claim 1, wherein the management module is logically disposed on an application service provider side of the application service provider demarcation.

13. The gateway device of claim 1, wherein the management module is logically disposed on the application service module side of the application service provider demarcation.

14. The gateway device of claim 1, wherein the remote service manager is operable to control the processing of the operational information across at least one of all gateway devices, on a class of gateway devices basis, and on a particular gateway device based on services provided via the remote service manager.

15. The gateway device of claim 1, wherein the management module, under the control of the remote service manager, is operable to perform at least one of: turning on/off the transmission of operational information, configuring and filtering the operational information, receiving and installing application code, configuring, analyzing and reporting on the operational information, and purging collected operational information.

16. The gateway device of claim 1, wherein the management module, under the control of the remote service manager, enables an agent authenticated and authorized by the remote service manager access to the stored operational information.

17. A system comprising:
   an endpoint device residing at a user premises having:
      a connection to a gateway device via a network;
      an operational information module operable to generate and provide access to operational information related to the availability, status, integrity, quality and performance of the endpoint device by a remote service manager via the gateway device; and
   the gateway device including an application service module providing at least one application service to the endpoint device and residing on a user premises side of a network service provider demarcation, the gateway having a management module operable to process the operational information and provide summary information based on the processed operational information on a per application service basis to the remote service manager.

18. The system of claim 17, wherein the network is selected from a group consisting of wired and wireless LAN, WAN, and IP networks, and Z wave and USB connections.

19. The system of claim 17, wherein the operational information module, under the control of the gateway device, is operable to generate and collect billing, alarm, statistical, summary statistical, and log information.

20. The system of claim 17, wherein the operational information module, under the control of the gateway device, is operable to generate and collect operational information across all users, on a per-user basis, and by a class of users based on a subscription to a service.

21. A system comprising:
at least one remote service manager coupled to a network;
at least one gateway device disposed at a user premises and in communication with the at least one remote service manager via the network, the at least one gateway device comprising at least one application performing traditional server functions and disposed on a user premises side of a network service provider demarcation;
at least one endpoint device disposed at the user premises and in communication through a user module with the at least one gateway device operable to, under the control of the gateway device, execute at least one application, and generate, collect, and provide access to operational information related to the execution of the at least one application; and
the at least one gateway device operable to, under the control of the at least one remote service manager, direct the at least one endpoint device to generate, collect, and provide access to operational information related to the execution of the at least one application, and to further generate, collect, and provide access to operational information related to the performance of the at least one gateway device, wherein the at least one gateway has a management module operable to process the operational information of the at least one endpoint device and the at least one gateway device to produce summary information and provide the summary information on a per application basis to the at least one remote service manager.

22. The system of claim 21, wherein the at least one remote service manager comprises a service management center external to the user premises.

23. The system of claim 21, wherein the at least one remote service manager comprises an application service provider external to the user premises.

24. The system of claim 21, wherein the gateway device further comprises an interface boundary between the user module and the application service module forming an application service provider demarcation.

25. The system of claim 21, wherein the operational information is selected from the group consisting of billing, alarm, statistical, summary statistical, and log information associated with the at least one gateway device, the at least one application, and the at least one endpoint device.

26. The system of claim 21, wherein the remote service manager is operable to direct the control of the operational information of at least one of the following: across all users, on a per-user basis, and by a class of users based on a subscription to a service.

27. The system of claim 21, wherein the management module, under the control of the remote service manager, is operable to perform at least one of retrieval, aggregation, compression, and filtering of the operational information.

28. The system of claim 21, wherein the management module, under the control of the remote service manager, is operable to determine the availability, status, integrity, quality and performance of at least one of: the at least one application, connectivity to a network, and at least one service offered via the remote service manager.

29. The system of claim 21, wherein the management module is logically disposed on the application service module side of the network service provider demarcation.

30. The system of claim 21, wherein the management module is logically disposed on the application service module side of the application service provider demarcation.

31. The system of claim 21, wherein the remote service manager is operable to control the generation, collection, management, and access to the operational information at least one of across all gateway devices, on a per-gateway device basis, and on a particular gateway device based on services provided via the remote service manager.

32. The system of claim 21, wherein the management module, under the control of the remote service manager, is operable to perform at least one of: turning on/off the transmission of operational information, configuring and filtering the operational information, receiving and installing application code, configuring, analyzing and reporting on the operational information, and purging collected operational information.

33. The system of claim 21, wherein the management module, under the control of the remote service manager, enables an agent authenticated and authorized by the remote service manager access to operational information stored on the at least one gateway device.

34. A service management system managing application services delivered by endpoint devices via gateway devices disposed at user premises, comprising:
a management module residing on the user premises coupled to a network module residing on the user premises, the network module coupled to a router via a computer network, an interface boundary between the management module and the network module forming a network service provider demarcation, the management module operable to generate, collect and analyze operational information generated by the application services, the gateway, and the endpoint devices to provide summary information on a per application service basis;
a connection manager operable to control system communications with the network module via the router and the computer network;
a central management module operable to direct the management module to send the summary information to the central management module to determine the availability, status, integrity, quality and performance of the application services, the gateway, and the endpoint devices, and
wherein at least one of the management module, the connection manager, and the central management module is a hardware device.

35. The system of claim 34, wherein the operational information is selected from the group consisting of billing, alarm, statistical, summary statistical, and log information associated with the gateway device, the at least one application, and the at least one endpoint device.

36. The system of claim 34, wherein the central management module is operable to direct the control of the operational information of at least one of the following: across all users, on a per-user basis, and by a class of users based on a subscription to a service.

37. The system of claim 34, wherein the central management module is operable to direct the gateway device to perform at least one of retrieval, aggregation, compression, and filtering of the operational information.

38. The system of claim 34, wherein the central management module is operable to direct the gateway device to control the generation, collection, management, and access to the operational information at least one of across all gateway devices, on a per-gateway device basis, and on a particular gateway device based on services provided via the remote service manager.

39. The system of claim 34, wherein the central management module is operable to direct the gateway device to perform at least one of: turning on/off the transmission of operational information, configuring and filtering the operational information, receiving and installing application code, configuring, analyzing and reporting on the operational information, and purging collected operational information.

40. The system of claim 34, wherein the central management module is operable to direct the gateway device to enable an authenticated and authorized agent to access the operational information.

41. A method of managing a operational information on a gateway device residing on a user premises having at least one endpoint device associated with the gateway device, the method comprising:
    delivering an application service traditionally residing on a network service provider's network through a network module to an application service module of the gateway device on the user premises side of a network service provider demarcation;
    executing the application service on the at least one endpoint device through a user module residing on the gateway device;
    directing the gateway device to generate and store the operational information related to the execution of the application service, the endpoint device, and the gateway device;
    directing the gateway device to process the operational information to produce summary information based on the processed operational information; and
    directing the gateway device to provide access to the summary information based on the processed operational information on a per application service basis.

42. The method of claim 41, further comprising defining an interface boundary between the application service module and the network module as a network service provider demarcation.

43. The method of claim 41, further comprising defining an interface boundary between the user module and the application service module as an application service provider demarcation.

44. The method of claim 41, wherein directing the gateway device to generate and store operational information comprises directing the gateway device to generate and store operational information related to billing, alarm, statistical, summary statistical, and log information associated with the gateway device, the at least one application service, and the at least one endpoint device.

45. The method of claim 41, wherein directing the gateway device to process the operational information further comprises directing the control of the operational information of at least one of the following: across all users, on a per-user basis, and by a class of users based on a subscription to the application service.

46. The method of claim 41, wherein the summary information identifies the availability, status, integrity, quality and performance of at least one of: the at least one application, connectivity to a network, and the application service.

47. The method of claim 41, wherein directing the gateway device to generate and store operational information comprises directing the generation, collection, management, and access to the operational information at least one of across all gateway devices, on a per-gateway device basis, and on a particular gateway device based on the application service.

48. The method of claim 41, wherein directing the gateway device to process operational information comprises directing the performance of at least one of: turning on/off the transmission of operational information, configuring and filtering the operational information, receiving and installing application code, configuring, analyzing and reporting on the operational information, and purging collected operational information.

49. The method of claim 41, wherein directing the gateway device to provide access further comprises enabling an authenticated and authorized agent access to the stored operational information.

50. A non-transitory, tangible computer-readable medium having encoded instructions thereon that cause an apparatus to execute a method of managing a gateway device for operation at a user premises having at least one endpoint device associated with the gateway device, the encoded method comprising:
    delivering an application service traditionally residing on a network service provider's network through a network module to an application service module of the gateway device on the user premises side of a network service provider demarcation;
    executing the application service on the at least one endpoint device through a user module residing on the gateway device;
    directing the gateway device to generate and store the operational information related to the execution of the application service, the endpoint device, and the gateway device;
    directing the gateway device to process the operational information to produce summary information based on the processed operational information; and
    directing the gateway device to provide access to the summary information based on the processed operational information on a per application service basis.

51. The non-transitory, tangible computer-readable medium of claim 50, wherein the encoded instructions thereon that cause the apparatus to execute the method further comprises defining an interface boundary between the application service module and the network module as a network service provider demarcation.

52. The non-transitory, tangible computer-readable medium of claim 50, wherein the encoded instructions thereon that cause the apparatus to execute the method further comprises defining an interface boundary between the user module and the application service module as an application service provider demarcation.

53. The non-transitory, tangible computer-readable medium of claim 50, wherein the encoded instructions thereon that cause the apparatus to execute the method further comprises directing the gateway device to generate and store operational information related to billing, alarm, statistical, and log information associated with the gateway device, the at least one application service, and the at least one endpoint device.

54. The non-transitory, tangible computer-readable medium of claim 50, wherein the encoded instructions thereon that cause the apparatus to execute the method further comprises directing the control of the operational information of at least one of the following: across all users, on a per-user basis, and by a class of users based on a subscription to the application service.

55. The non-transitory, tangible computer-readable medium of claim 50, wherein the summary information identifies the availability, status, integrity, quality and performance of at least one of: the at least one application, connectivity to a network, and the application service.

56. The non-transitory, tangible computer-readable medium of claim 50, wherein the encoded instructions thereon that cause the apparatus to execute the method further comprises directing the generation, collection, management, and access to the operational information at least one of across all gateway devices, on a per-gateway device basis, and on a particular gateway device based on the application service.

57. The non-transitory, tangible computer-readable medium of claim 50, wherein the encoded instructions thereon that cause the apparatus to execute the method further comprises directing the performance of at least one of: turning on/off the transmission of operational information, configuring and filtering the operational information, receiving and installing application code, configuring, analyzing and reporting on the operational information, and purging collected operational information.

58. The non-transitory, tangible computer-readable medium of claim 50, wherein the encoded instructions thereon that cause the apparatus to execute the method further comprises enabling an authenticated and authorized agent access to the stored operational information.

59. The non-transitory, tangible computer-readable medium of claim 50, wherein the summary information is a two-bit data representing a degree of service delivery success.

60. The non-transitory, tangible computer-readable medium of claim 59, wherein the encoded instructions thereon that cause the apparatus to execute the method further comprises collecting the two-bit data from a plurality of gateway devices and generate summary statistics in response to the collected two-bit data therefrom.

\* \* \* \* \*